United States Patent
Kondo et al.

(10) Patent No.: US 10,495,448 B2
(45) Date of Patent: Dec. 3, 2019

(54) DISPLACEMENT MEASURING DEVICE, MEASURING SYSTEM AND DISPLACEMENT MEASURING METHOD

(71) Applicant: OMRON Corporation, Kyoto (JP)

(72) Inventors: Tomonori Kondo, Fukuchiyama (JP); Yuta Suzuki, Ayabe (JP); Kenichi Matoba, Otsu (JP); Yoshihiro Kanetani, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/893,714

(22) Filed: Feb. 12, 2018

(65) Prior Publication Data

US 2019/0094013 A1    Mar. 28, 2019

(30) Foreign Application Priority Data

Sep. 26, 2017    (JP) ................................ 2017-184995

(51) Int. Cl.
| | | |
|---|---|---|
| *G01B 11/14* | (2006.01) | |
| *G06F 17/11* | (2006.01) | |
| *G01B 11/06* | (2006.01) | |

(52) U.S. Cl.
CPC .......... *G01B 11/14* (2013.01); *G01B 11/0608* (2013.01); *G06F 17/11* (2013.01); *G01B 2210/50* (2013.01)

(58) Field of Classification Search
CPC ............ G02B 2027/0187; G02B 27/01; G02B 2027/014; G02B 26/0833; G02B 1/12; G02B 2006/12164; G02B 2027/0138; G02B 27/0012; G02B 5/1814; G02B 5/1828; G02B 5/1861; G02B 5/289; G02B 5/32; G02B 6/0016; G02B 6/124; G02B 6/34; G01N 2291/02827; G01N 2291/02466; G01N 2291/02881; G01N 2291/0427; G01N 29/022; G01N 29/032;
(Continued)

(56) References Cited

U.S. PATENT DOCUMENTS

| | | | |
|---|---|---|---|
| 2005/0213112 A1 | 9/2005 | Nakashita et al. | |
| 2013/0010305 A1 | 1/2013 | Oyama et al. | |
| 2018/0364034 A1* | 12/2018 | Reiter | G01B 11/2518 |

FOREIGN PATENT DOCUMENTS

| | | |
|---|---|---|
| DE | 102015121673 | 6/2017 |
| EP | 1167918 | 1/2002 |

(Continued)

OTHER PUBLICATIONS

Office Action of Korean Counterpart Application, with English translation thereof, dated Oct. 22, 2018, pp. 1-23.
(Continued)

*Primary Examiner* — Michael P Stafira
(74) *Attorney, Agent, or Firm* — JCIPRNET

(57) ABSTRACT

A displacement measuring device capable of accurately measuring a distance to a measurement target surface is provided. The displacement measuring device includes a light projecting part generating light, a sensor head irradiating a measurement target with the light and receiving light of the irradiated light reflected by a measurement target surface of the measurement target, and a control part calculating a value indicating a distance to the measurement target surface on the basis of the light received by the sensor head. The control part processes the calculated value as the value indicating the distance to the measurement target surface on condition that the calculated value is included in a preset numerical range and resets the preset numerical range on the basis of the calculated value.

19 Claims, 17 Drawing Sheets

(58) Field of Classification Search
CPC ........... G01N 33/54373; G01N 15/088; G01N 2015/086; G01N 2291/014; G01N 2291/015; G01N 2291/02491; G01N 2291/0423; G01N 25/005; G01N 25/18; G01N 29/2418; G01N 29/30; G01N 29/46; G01N 33/54366; G01N 9/00; G01B 11/30; G01B 11/02; G01B 11/00; G01B 11/002; G01B 11/0616; G01B 21/085; G01B 7/085; G01J 1/0204; G01J 1/0407; G01J 1/4204; G01J 3/2803; G01J 3/42; G01J 5/38; G01J 5/40
See application file for complete search history.

(56) References Cited

FOREIGN PATENT DOCUMENTS

| | | |
|---|---|---|
| EP | 2010863 | 1/2009 |
| JP | 2002039720 | 2/2002 |
| JP | 2002195807 | 7/2002 |
| JP | 2012-208102 | 10/2012 |
| JP | 2013-090045 | 5/2013 |
| JP | 2014089085 | 5/2014 |
| JP | 2015169475 | 9/2015 |
| TW | I279522 | 4/2007 |
| WO | 2011144624 | 11/2011 |

OTHER PUBLICATIONS

"Search Report of Europe Counterpart Application", dated Apr. 26, 2018, p. 1-p. 7.

"Office Action of Taiwan Counterpart Application," with English translation thereof, dated Aug. 2, 2018, p. 1-p. 15.

Office Action of Korean Counterpart Application, with English translation thereof, dated Apr. 8, 2019, pp. 1-8.

"Third Party Observation", submitted on Aug. 20, 2019, pp. 1-3.

* cited by examiner

DISPLACEMENT MEASURING DEVICE, MEASURING SYSTEM AND DISPLACEMENT MEASURING METHOD

CROSS-REFERENCE TO RELATED APPLICATION

This application claims the priority of Japan patent application serial no. 2017-184995, filed on Sep. 26, 2017. The entirety of the above-mentioned patent application is hereby incorporated by reference herein and made a part of this specification.

BACKGROUND

Technical Field

The disclosure relates to a displacement measuring device, a system including the displacement measuring device and a displacement measuring method.

Description of Related Art

Conventionally, for example, as disclosed in Patent Document 1, a displacement measuring device using a white confocal method as a measuring method is known. In this displacement measuring device, while a non-contact type sensor head moves, a distance (displacement) between a measurement target and the sensor head is continuously measured.

Further, there is a workpiece in which quality control is performed by measuring a thickness or a displacement of a component on the basis of reflected light from a plurality of positions. As such a workpiece, there are, for example, a workpiece (anti-reflection processed optical component, such as an anti-reflective (AR) coat, or the like) including a material which hardly reflects light, and a workpiece having a multilayer structure (a group of assembled lenses, or the like).

Further, conventionally, as disclosed in Patent Document 2, a displacement measuring device using a triangulation method as a measuring method is known.

[Patent Document 1] Japanese Unexamined Patent Application Publication No. 2012-208102
[Patent Document 2] Japanese Unexamined Patent Application Publication No. 2013-90045

In the workpiece as described above, reflected light is not always stably received from all the measurement positions. For example, as indicated by a waveform 911 in FIG. 22, when a received light amount with respect to light reflected by a first measurement target surface is small and is equal to or smaller than a surface detection threshold value, the displacement measuring device processes light reflected by a second measurement target surface, which is indicated by a waveform 912, as the light reflected by the first measurement target surface. Specifically, the displacement measuring device processes a distance to the first measurement target surface as a distance L912 instead of a distance L911.

Further, in the case in which there is reflected light from many positions, the measurement target surface may deviate from a measurement range due to minute positional displacement of a workpiece. For example, as illustrated in FIG. 23, when the first measurement target surface deviates from a measurement range, the displacement measuring device processes the light reflected by the second measurement target surface, which is indicated by a waveform 922, as the light reflected by the first measurement target surface. Specifically, the displacement measuring device processes a distance to the first measurement target surface as a distance L922.

In addition, when the measurement is repeated by sequentially shifting a relative position between the sensor head and the workpiece, the positions of the waveforms 912 and 922 may vary in a direction of a horizontal axis in FIGS. 22 and 23.

Therefore, with respect to the workpiece as described above, the distance to each measurement target surface may not be accurately measured. Accordingly, it is required to accurately measure the distance to the measurement target surface in various workpieces including such a workpiece.

An aspect of the disclosure is to provide a displacement measuring device, a system, and a displacement measuring method capable of accurately measuring a distance to a measurement target surface.

SUMMARY

According to one aspect of the disclosure, a displacement measuring device includes a light projecting part generating light, a sensor head irradiating a measurement target with the light and receiving light reflected by a measurement target surface of the measurement target from the irradiated light, and a control part calculating a value indicating a distance to the measurement target surface on the basis of the light received by the sensor head. The control part processes the calculated value as the value indicating the distance to the measurement target surface on condition that the calculated value is included in a preset numerical range and resets the preset numerical range on the basis of the calculated value.

According to one aspect of the disclosure, a measuring system includes the displacement measuring device and an information processing device capable of communicating with the displacement measuring device. The information processing device displays with a graph an amount of light received by a light receiving part of the displacement measuring device in association with a distance from the sensor head and changes a display mode of the preset numerical range in the displayed graph from a default mode to a preset mode.

According to one aspect of the disclosure, a displacement measuring method including steps as follow: generating light; irradiating a measurement target with the light; receiving light reflected by a measurement target surface of the measurement target from the irradiated light; calculating a value indicating a distance to the measurement target surface on the basis of the received light; and processing the calculated value as a value indicating the distance to the measurement target surface on condition that the calculated value is included in a preset numerical range and resetting the numerical range on the basis of the calculated value.

DESCRIPTION OF THE EMBODIMENTS

Figure 1:
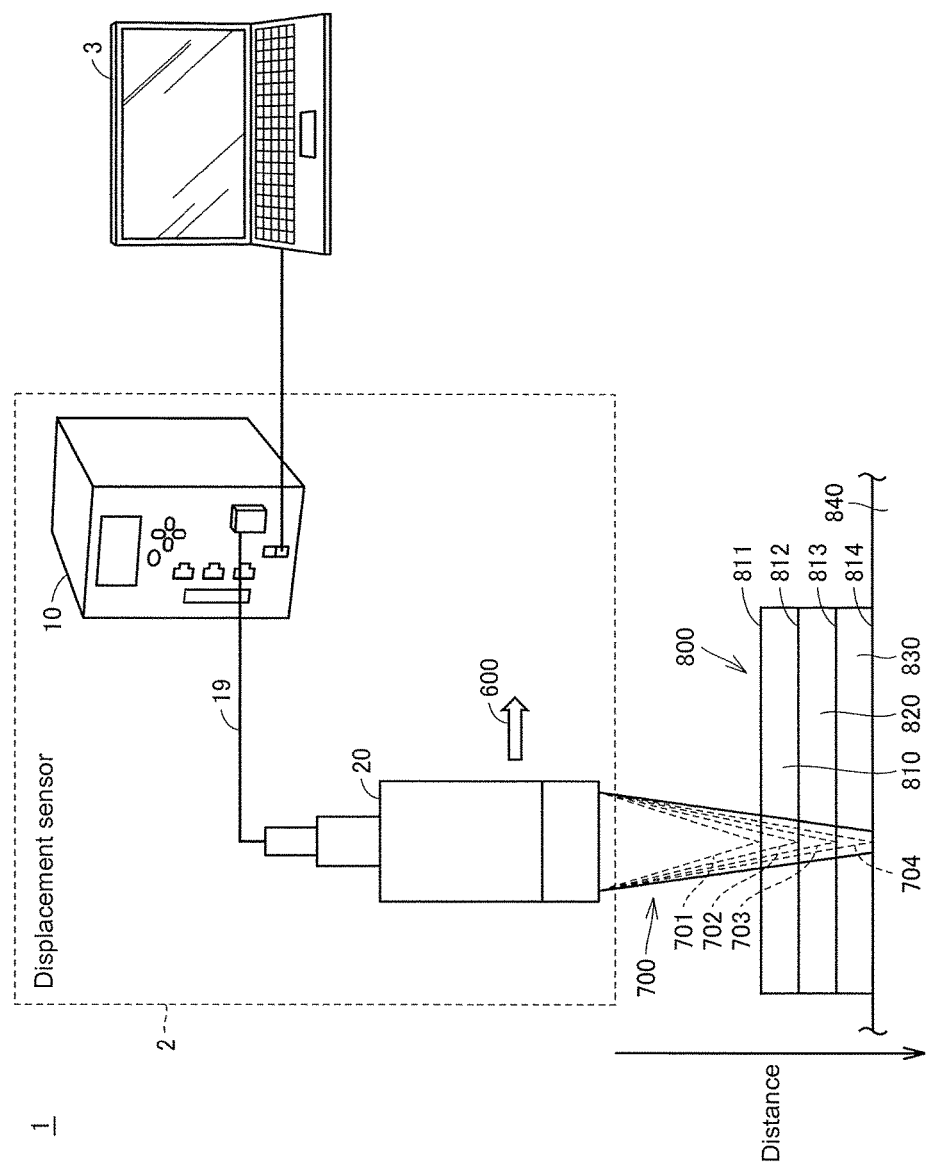
FIG. 1 is a diagram illustrating a configuration of a measuring system according to an embodiment.

Hereinafter, embodiments of the disclosure will be described with reference to the drawings. In the following description, the same parts are designated by the same reference numerals. Their names and functions thereof are also the same. Therefore, detailed description thereof will not be repeated.

A. Configuration of System

FIG. 1 is a diagram illustrating a configuration of a measuring system according to the embodiment.

Referring to FIG. 1, a measuring system 1 includes a displacement sensor 2 and an information processing device 3. The information processing device 3 is typically a personal computer.

The displacement sensor 2 is a sensor using wavelength dispersion. Specifically, the displacement sensor 2 is a displacement measuring device using a white confocal method as a measuring method. The displacement sensor 2 is also referred to as a fiber coaxial displacement sensor. The displacement sensor 2 includes a sensor controller 10, a light guiding part 19, and a sensor head 20. The sensor head 20 includes a confocal optical system. Specifically, the sensor head 20 includes an objective lens and a chromatic aberration unit.

The sensor controller 10 generates light (typically, white light) having a preset wavelength spread (wavelength width). This light propagates through the light guiding part 19 and reaches the sensor head 20.

In the sensor head 20, the propagated light is focused by the objective lens and irradiates a measurement target 800. Since axial chromatic aberration occurs in irradiation light 700 when the irradiation light 700 passes through the chromatic aberration unit, a focal position of the irradiation light irradiated from the objective lens varies according to each wavelength. Only light of a wavelength focused on the measurement target 800 is incident again on the light guiding part 19.

The measurement target 800 has layers 810, 820 and 830 which can allow white light to pass through. For example, each of the layers 810, 820 and 830 is formed on a substrate 840 (base material) which does not allow the white light to pass through.

Light 701 of a wavelength focused on a first surface 811 of the measurement target 800, light 702 of a wavelength focused on a second surface 812, light 703 of a wavelength focused on a third surface 813, and light 704 of a wavelength focused on a fourth surface 814 are received as reflected light by the sensor head 20.

Further, each of the surfaces 811 to 814 is a measurement target surface. Specifically, the first surface 811 is an upper surface of a first layer 810 and is a surface exposed to the outside. The second surface 812 is an upper surface of a second layer 820 and is in contact with the layer 810 located on a side above thereof. The third surface 813 is an upper surface of a third layer 830 and is in contact with the layer 820 located on a side above thereof. The fourth surface 814 is a surface of the substrate 840 and is in contact with the layer 830 located on a side above thereof.

Reflected light received by the sensor head 20 is incident on the sensor controller 10 via the light guiding part 19. The sensor controller 10 calculates a distance from the sensor head 20 to the measurement target 800 on the basis of the reflected light. Specifically, the sensor controller 10 calculates each distance (displacement) from the sensor head 20 to each of the layers 810, 820 and 830 of the measurement target 800 and a distance (displacement) to the substrate 840 on the basis of the reflected light.

In the displacement sensor 2, the distance measurement and the movement of the sensor head 20, for example, in a direction of an arrow 600 are repeated. Accordingly, for each of the surfaces 811 to 814, measurement values at a plurality of places along the surface are obtained.

Further, the sensor head 20 may not move, and the measurement target 800 may move on a production line. This example can be applied to a system in which the measurement is performed while a relative position between the sensor head 20 and the measurement target 800 changes.

The information processing device 3 is connected to the sensor controller 10. Various settings of the sensor controller 10 may be changed by the information processing device 3. Also, the information processing device 3 may display information such as the distance calculated by the sensor controller 10. Various functions of the information processing device 3 will be described later. Further, such setting and display may be performed by the sensor controller 10 alone.

Further, since hardware configurations of the sensor controller 10, the sensor head 20 and the light guiding part 19 are the same as those of conventional one, description thereof will not be repeated here.

B. Overview of Processing

In the measuring system 1, a setting range of each of the surfaces 811 to 814 is specified, and a distance obtained within each setting range is set as a distance to each of the surfaces 811 to 814. Further, the setting range may be a region which defines a position of the measurement target surface (that is, a distance at which an amount of received light is a peak). Hereinafter, a specific example of such a configuration will be described.

Figure 2:
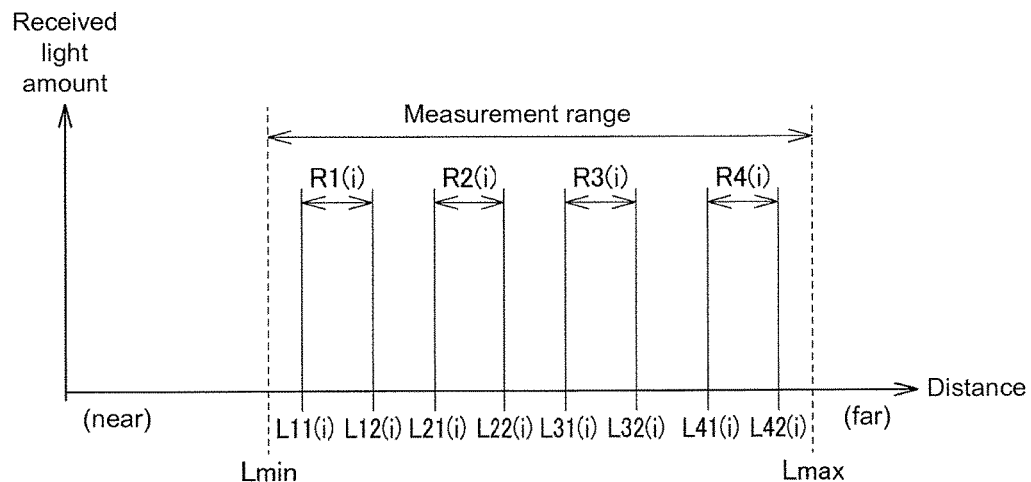
FIG. 2 is a diagram illustrating a setting range of each measurement target surface.

FIG. 2 is a diagram illustrating the setting range of each of the surfaces 811 to 814.

Referring to FIG. 2, a range $R1(i)$ is set as the setting range of the first surface 811. Likewise, a range $R2(i)$ is set as the setting range of the second surface 812. Also, a range $R3(i)$ is set as the setting range of the third surface 813, and a range $R4(i)$ is set as the setting range of the fourth surface 814. Details of a range setting method will be described later.

Further, the range $R1(i)$ is a range from a distance $L11(i)$ to a distance $L12(i)$. Likewise, the ranges $R2(i)$, $R3(i)$ and $R4(i)$ are a range from a distance $L21(i)$ to a distance $L22(i)$, a range from a distance $L31(i)$ to a distance $L32(i)$, and a range from a distance $L41(i)$ to a distance $L42(i)$, respectively. The range (measurement range) which can be measured by the displacement sensor 2 is a range from a distance Lmin to Lmax.

In the above description, i is an arbitrary natural number of 1 or more. Initial values $R1(1)$, $R2(1)$, $R3(1)$ and $R4(1)$ of the ranges $R1(i)$ to $R4(i)$ are set by a user using the information processing device 3. Further, the displacement sensor 2 sequentially changes each of the ranges $R1(i)$, $R2(i)$, $R3(i)$ and $R4(i)$ for each measurement period. That is, when focusing on the range $R1(i)$, $R1(i+1)$ is set (reset) after $R1(i)$, and then $R1(i+2)$ is set (reset). Such change (resetting) of the setting range is performed by a control part 11 (refer to FIG. 13) of the sensor controller 10 forming the displacement sensor 2.

Hereinafter, the ranges $R1(i)$, $R2(i)$, $R3(i)$ and $R4(i)$ will be described as the setting ranges used for i-th measurement. Further, since the measurement and the movement of the sensor head 20 are repeatedly performed, an i-th measurement point and a (i+1)-th measurement point are different from each other.

Figure 3:
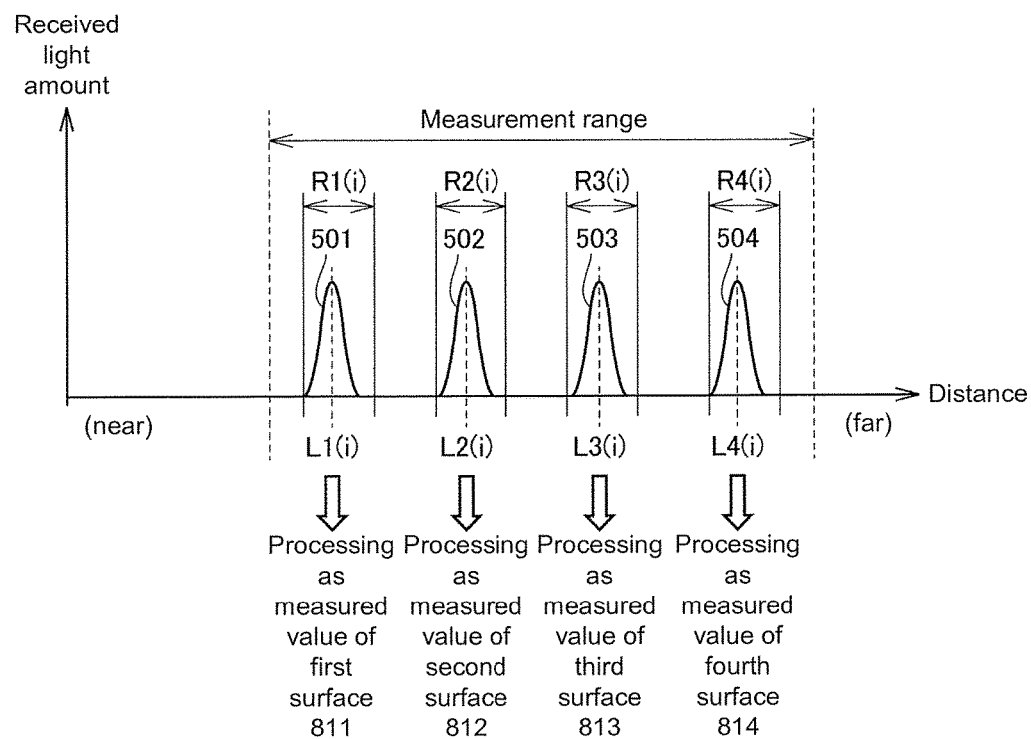
FIG. 3 is a diagram illustrating an i-th measurement value in one situation.

FIG. 3 is a diagram illustrating an i-th measurement value in one situation.

Referring to FIG. 3, in the sensor controller 10, waveforms 501, 502, 503 and 504 of four wavelengths are detected as waveforms indicating the amount of received reflected light. Distances at which the waveforms 501, 502, 503 and 504 are peaks are distances $L1(i)$, $L2(i)$, $L3(i)$ and $L4(i)$, respectively.

The distance $L1(i)$ is included in the range $R1(i)$. Therefore, the sensor controller 10 processes the distance $L1(i)$ as a distance to the first surface 811 of the layer 810. Specifically, the distance $L1(i)$ is defined as a measurement value.

Further, the distance $L2(i)$ is included in the range $R2(i)$. Therefore, the sensor controller 10 processes the distance $L2(i)$ as a distance to the second surface 812 of the layer 820. Similarly, the sensor controller 10 processes the distance $L3(i)$ as a distance to the third surface 813 and processes the distance $L4(i)$ as a distance to the fourth surface 814.

Figure 4:
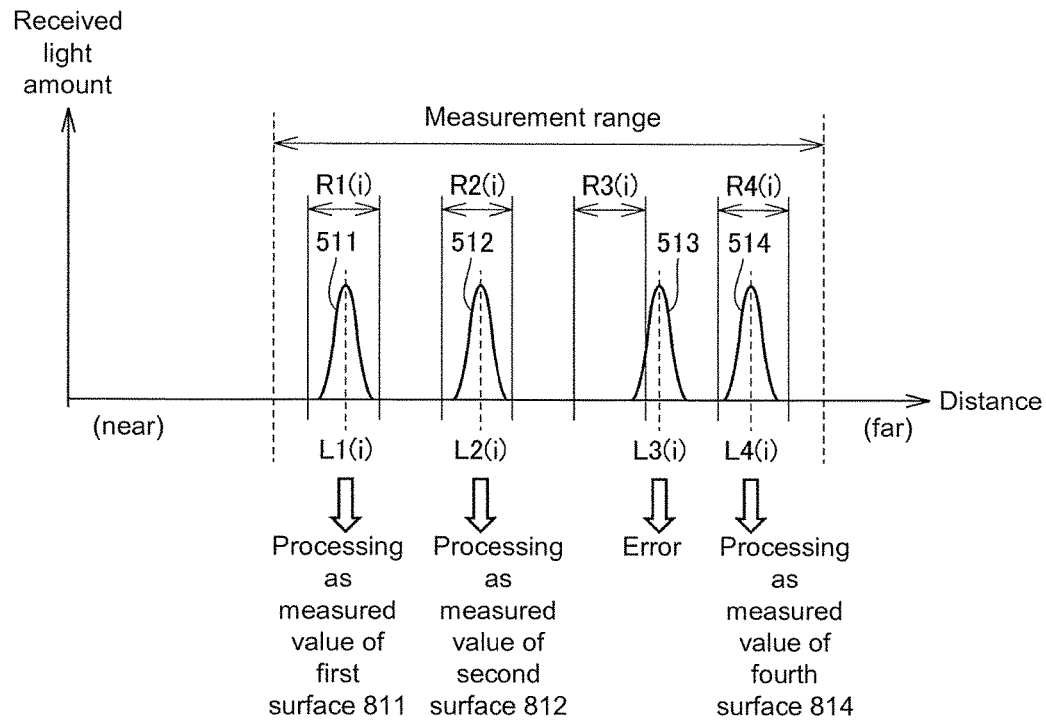
FIG. 4 is a diagram illustrating an i-th measurement value in a different situation from FIG. 3.

FIG. 4 is a diagram illustrating an i-th measurement value in a different situation from FIG. 3.

Referring to FIG. 4, in the sensor controller 10, waveforms 511, 512, 513 and 514 of four wavelengths are detected as waveforms indicating the amount of received reflected light. For convenience of explanation, peaks of the waveforms 511, 512, 513 and 514 are described as the distances $L1(i)$, $L2(i)$, $L3(i)$ and $L4(i)$, respectively, similarly to FIG. 3.

The distance $L1(i)$ at which the received light amount is a peak with respect to the waveform 511 is included in the range $R1(i)$. Therefore, the sensor controller 10 processes the distance $L1(i)$ as a distance to the first surface 811. Similarly, the sensor controller 10 processes the distance $L2(i)$ as a distance to the second surface 812 and also processes the distance $L4(i)$ as a distance to the fourth surface 814.

However, the distance $L3(i)$ at which the received light amount is a peak with respect to the waveform 513 is not included in the range $R3(i)$. Therefore, the sensor controller 10 does not process the distance $L3(i)$ as a distance to the third surface 813. The sensor controller 10 processes the distance to the third surface 813 as immeasurable (error processing).

As described above, the sensor controller 10 processes a distance of the four calculated distances which is included in a preset numerical range (for example, the distance $L1(i)$ included in the range $R1(i)$) as the distance to the measurement target surface of a preset layer or the measurement target surface of the substrate 840 (for example, the distance to the first surface 811 of the layer 810) among the layers 810, 820 and 830 and the substrate 840.

According to such a configuration, since a distance not included in a numerical range is not processed as a distance to a measurement target surface, it is possible to accurately measure the distance to each of the surfaces 811 to 814.

Figure 5:
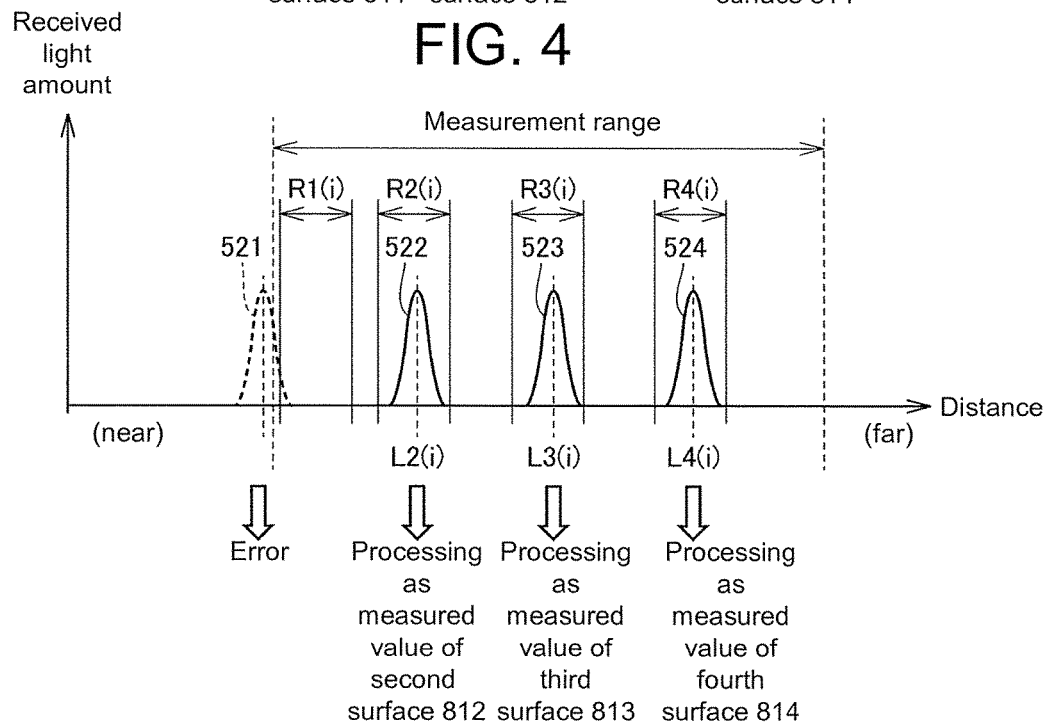
FIG. 5 is a diagram illustrating an i-th measurement value in a different situation from FIG. 3 and FIG. 4.

FIG. 5 is a diagram illustrating an i-th measurement value in a different situation from FIG. 3 and FIG. 4.

Referring to FIG. 5, in the sensor controller 10, waveforms 521, 522, 523 and 524 of four wavelengths are detected as waveforms indicating the amount of received reflected light. For convenience of explanation, the distances at which the waveforms 522, 523 and 524 are peaks are described as $L2(i)$, $L3(i)$ and $L4(i)$, respectively, similarly to FIG. 3 and FIG. 4.

The distance $L2(i)$ at which the received light amount is a peak with respect to the waveform 522 is included in the range $R2(i)$. Therefore, the sensor controller 10 processes the distance $L2(i)$ as the distance to the second surface 812. Similarly, the sensor controller 10 processes the distance $L3(i)$ as the distance to the third surface 813 and also processes the distance $L4(i)$ as the distance to the fourth surface 814.

However, as indicated by the waveform 521, since the first surface 811 is located outside the measurement range of the sensor head 20, the sensor controller 10 cannot detect the peak in the received light amount included in the range $R1(i)$. Therefore, the sensor controller 10 processes the distance to the first surface 811 as immeasurable (error processing).

As described above, the sensor controller 10 processes a distance of the four calculated distances which is included in a preset numerical range as the distance to the measurement target surface of a preset layer or the measurement target surface of the substrate 840 among the layers 810, 820 and 830 and the substrate 840.

According to such a configuration, a distance not included in a numerical range is not processed as a distance to a measurement target surface. Particularly, in the case of FIG.

5, the sensor controller 10 can prevent the distance to the first surface 811 which is the first measurement target surface from being processed as the distance L2(i). Therefore, according to the sensor controller 10, it is possible to accurately measure the distance to each of the surfaces 811 to 814.

Figure 6:
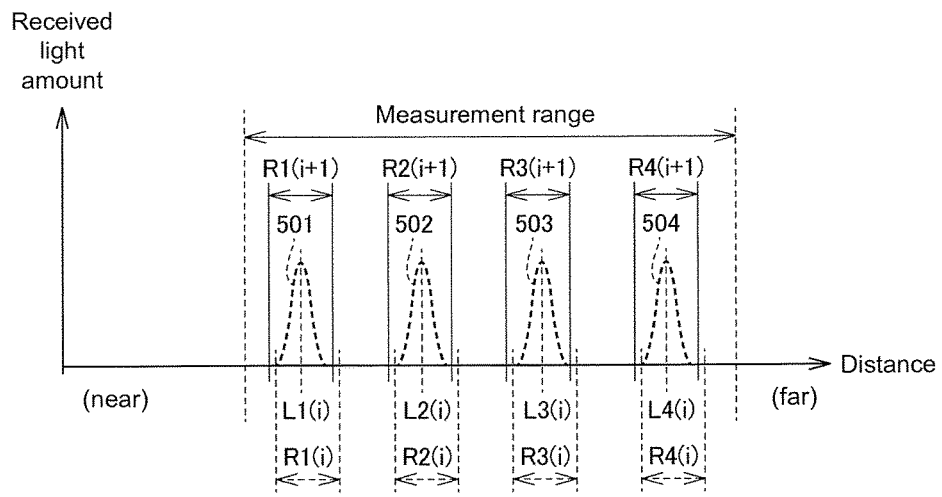
FIG. 6 is a diagram illustrating a change in the setting range.

FIG. 6 is a diagram illustrating a change in the setting range.

Referring to FIG. 6, the sensor controller 10 changes the setting range related to the first surface 811 from the range R1(i) to the range R(i+1) on the basis of the distance L1(i) included in the range R1(i). Typically, the sensor controller 10 sets (resets) the range R1(i+1) so that the distance L1(i) is a middle value of the range R1(i+1).

Similarly, the sensor controller 10 changes the setting range related to the second surface 812 from the range R2(i) to the range R2(i+1) on the basis of the distance L2(i) included in the range R2(i). Also, the sensor controller 10 changes the setting range related to the third surface 813 from the range R3(i) to the range R3(i+1) and also sets the setting range related to the fourth surface 814 from the range R4(i) to the range R4(i+1).

As described above, the displacement sensor makes the setting range related to each of the surfaces 811 to 814 follow each of the distances L1(i) to L4(i) which are the measurement values. Accordingly, the number of times that error processing is performed is reduced as compared with the configuration in which such follow-up adherence processing (setting range re-setting processing) is not performed. Therefore, according to such a configuration, it is possible to accurately measure the distance to each of the surfaces 811 to 814 and it is possible to acquire a lot of data for the distances to the surfaces 811 to 814.

Further, in the above-described configuration, an example of the configuration in which measurement is continued even when an error occurs has been described. However, the measuring system 1 may be configured to stop measurement at the time when an error occurs.

C. Details of Processing (c1. Initial Setting)

As described above, the ranges R1(1), R2(1), R3(1) and R4(1) which are initial values are set by the user using the information processing device 3. Such initial values are set in a teaching mode. In addition, such setting may also be performed by the sensor controller 10 alone.

Further, typically, the sensor controller 10 stores the default value for the numerical range in advance. The default value is changed on the basis of the teaching process, and the changed value is used as the initial value.

The sensor controller 10 sets the ranges R1(1), R2(1), R3(1) and R4(1) on the basis of the distance to each of the surfaces 811, 812, 813 and 814 measured at the time of teaching (the distance at a peak in the received light amount) and the width of the setting range input by the user (a difference between an upper limit value and a lower limit value of a setting range). Specifically, the sensor controller 10 determines the range R1(1) so that the distance to the first surface 811 becomes the middle value of the input width. The sensor controller 10 sets the range R2(1) so that the distance to the second surface 812 becomes the middle value of the input width. The ranges R3(1) and R4(1) are also set in the same manner.

In the measuring system 1, the width of the setting range may be set for each of the ranges R1(1), R2(1), R3(1) and R4(1).

(c2. Processing After Start of Measurement)

At the time of measurement, various situations other than the situations illustrated in FIGS. 3, 4 and 5 may occur. Hereinafter, processing in the case in which a situation other than the above-described situation occurs will be described.

(1) Case in which Measurement Value Cannot be Obtained

Figure 7:
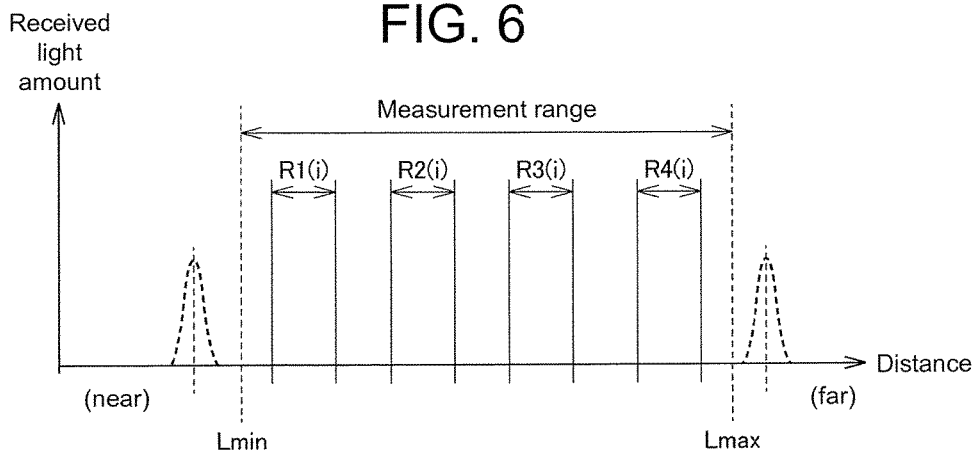
FIG. 7 is a diagram illustrating a case in which a sensor controller cannot acquire a measurement value.

FIG. 7 is a diagram illustrating a case in which the sensor controller 10 cannot acquire a measurement value.

Referring to FIG. 7, when there are no peaks of the received light amount within the measurement range (within the ranges of the distances Lmin to Lmax), the sensor controller 10 determines that no measurement target surfaces are present and processes this as an outside of all setting ranges error. In this case, for this measurement instance, the sensor controller 10 assumes that there is no data indicating the distance to each of the surfaces 811 to 814.

(2) Case in which Setting Ranges Overlap

Figure 8:
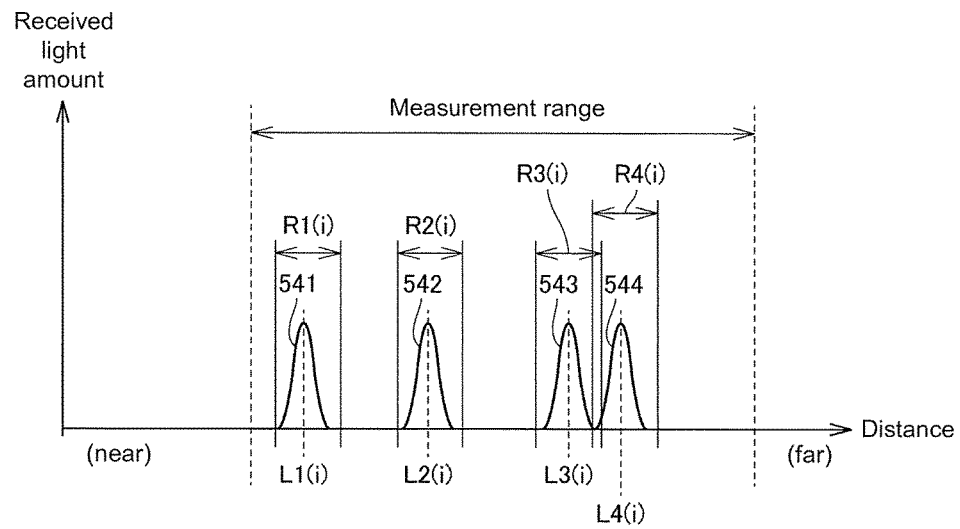
FIG. 8 is a diagram illustrating a case in which setting ranges overlap due to the change in the setting range.

FIG. 8 is a diagram illustrating a case in which setting ranges overlap due to a change in a setting range.

Referring to FIG. 8, in the sensor controller 10, it is assumed that waveforms 541, 542, 543 and 544 of four wavelengths are detected after setting the ranges R1(i) to R4(i). Further, it is assumed that the distances at which the waveforms 541, 542, 543 and 544 are peaks are distances L1(i), L2(i), L3(i) and L4(i), respectively.

The distance L1(i) at which the received light amount is a peak with respect to the waveform 541 is included in the range R1(i). Therefore, the sensor controller 10 processes the distance L1(i) as the distance to the first surface 811 of the layer 810. Similarly, the sensor controller 10 processes the distance L2(i) as the distance to the second surface 812.

However, the already set range R3(i) and the range R4(i) partially overlap each other. In this case, the sensor controller 10 processes a measurement value included in the overlapping range as an error. In this case, for this measurement instance, the sensor controller 10 assumes that the measurement value (distance L3(i)) of the third surface 813 and the measurement value (distance L4(i)) of the fourth surface 814 are not present.

Figure 9:
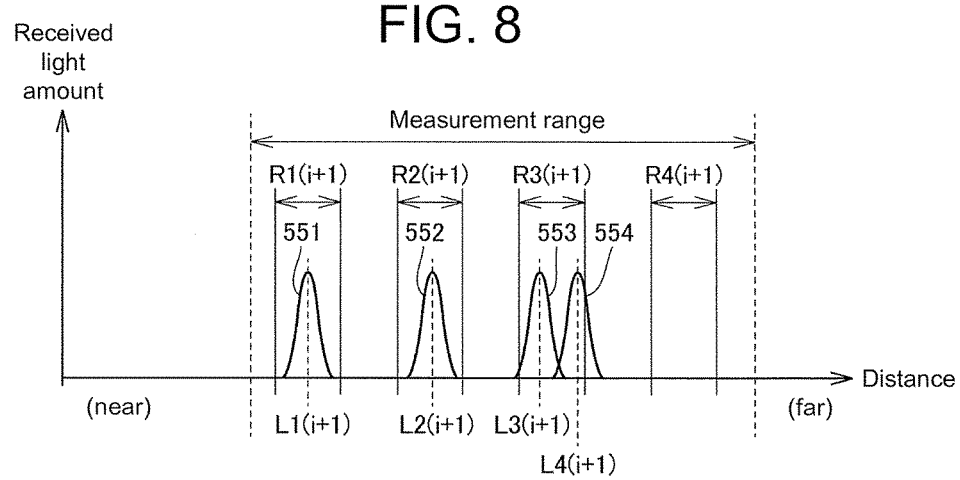
FIG. 9 is a diagram illustrating a case in which a plurality of measurement target surfaces is detected within one setting range.

(3) Case in which a Plurality of Measurement Target Surfaces is Detected Within One Setting Range FIG. 9 is a diagram illustrating a case in which a plurality of measurement target surfaces is detected within one setting range.

Referring to FIG. 9, in the sensor controller 10, it is assumed that waveforms 551, 552, 553 and 554 of four wavelengths are detected after the ranges R1(i+1) to R4(i+1) are set. Further, it is assumed that the distances at which the waveforms 551, 552, 553 and 554 are peaks are distances L1(i+1), L2(i+1), L3(i+1) and L4(i+1), respectively.

The distance L1(i+1) at which the received light amount is a peak with respect to the waveform 551 is included in the range R1(i+1). Therefore, the sensor controller 10 processes the distance L1(i+1) as the distance to the first surface 811 of the layer 810. Similarly, the sensor controller 10 processes the distance L2(i+1) as the distance to the second surface 812.

However, the range R3(i+1) includes two peaks of the received light amounts. That is, the sensor controller 10 detects two measurement target surfaces in the range R3(i+1).

In this case, the sensor controller 10 sets a range R3(i+2) set after the range R3(i+1) as follows.

Figure 10:
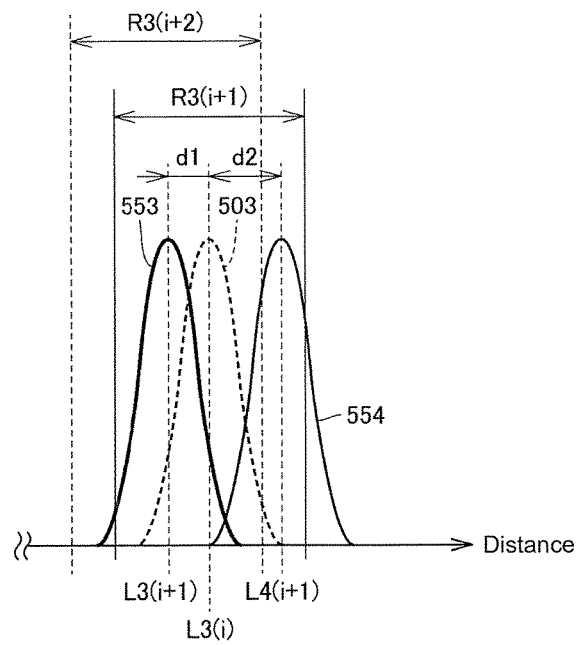
FIG. 10 is a diagram illustrating a method of setting a setting range.

FIG. 10 is a diagram illustrating a method of setting the range R3(i+2).

Referring to FIG. 10, the sensor controller 10 selects one of the distance L3($i$+1) and the distance L4($i$+1) which is closer to the previous measurement value (distance L3($i$)). When a distance between the distance L3($i$) and the distance L3($i$+1) is d1 and a distance between the distance L3($i$) and the distance L4($i$+1) is d2 (>d1), the sensor controller 10 selects the distance L3($i$+1). In this case, the sensor controller 10 sets the range R3($i$+2) so that the distance L3($i$+1) becomes a middle value in the next range R3($i$+2).

As described above, when the distance L3($i$+1) and the distance L4($i$+1) are included in the range R3($i$+1), the sensor controller 10 makes one of the distance L3($i$+1) and the distance L4($i$+1) closer to the distance L3($i$) be a middle value of the changed range R3($i$+2).

According to such a configuration, it is possible to appropriately set a next range.

(4) Case in which Measurement Value is not Within Setting Range

Figure 11:
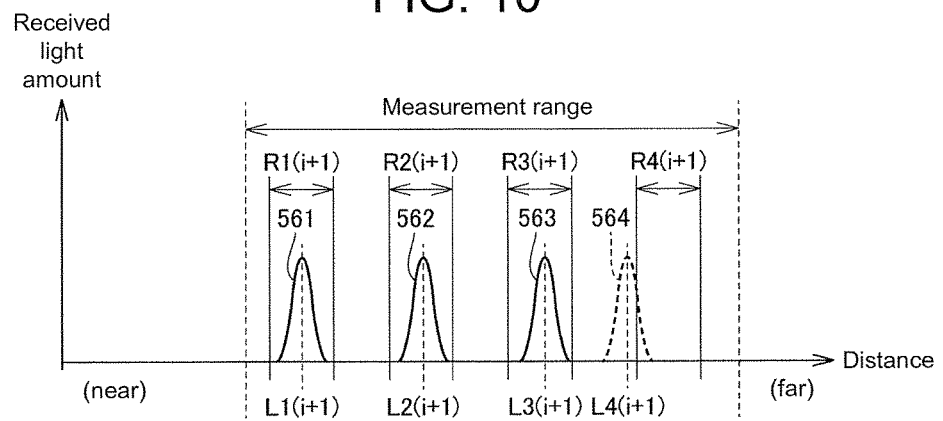
FIG. 11 is a diagram illustrating a case in which a measurement value is not within a setting range.

FIG. 11 is a diagram illustrating a case in which a measurement value is not within a setting range.

Referring to FIG. 11, in the sensor controller 10, it is assumed that waveforms 561, 562, 563 and 564 of four wavelengths are detected after the ranges from R1($i$+1) to R4($i$+1) are set.

Further, it is assumed that the distances at which the waveforms 561, 562, 563 and 564 are peaks are distances L1($i$+1), L2($i$+1), L3($i$+1), and L4($i$+1), respectively.

The distance L1($i$+1) at which the received light amount is a peak with respect to the waveform 561 is included in the range R1($i$+1). Therefore, the sensor controller 10 processes the distance L1($i$+1) as the distance to the first surface 811 of the layer 810. Similarly, the sensor controller 10 processes the distance L2($i$+1) as the distance to the second surface 812 and also processes the distance L3($i$+1) as the distance to the third surface 813.

However, the distance L4($i$+1) at which the received light amount is a peak with respect to the waveform 564 is not included in R4($i$+1). Therefore, the sensor controller 10 does not process the distance L4($i$+1) as the distance to the fourth surface 814. The sensor controller 10 processes the distance to the fourth surface 814 as immeasurable (error processing).

In this case, the sensor controller 10 sets a range R4($i$+2) set after the range R4($i$+1) as follows.

Figure 12:
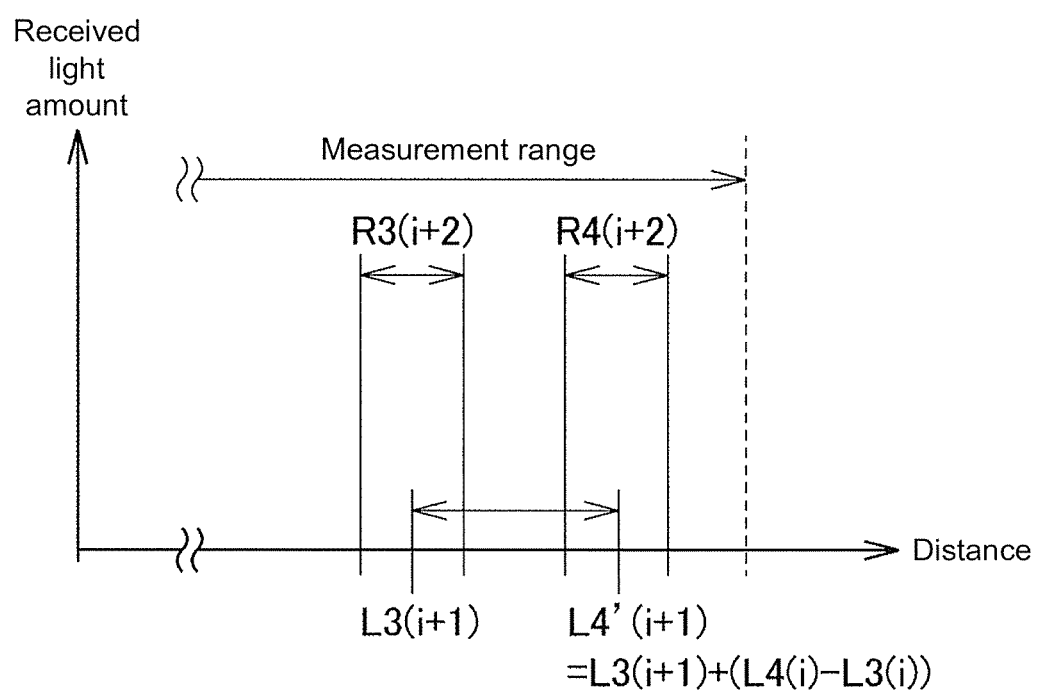
FIG. 12 is a diagram illustrating the method of setting the setting range.

FIG. 12 is a diagram illustrating a method of setting the range R4($i$+2).

Referring to FIG. 12, the sensor controller 10 calculates the distance L4'($i$+1) for determining the range R4($i$+2) using the distance L3($i$), the distance L3($i$+1) and the distance L4($i$). The sensor controller 10 does not use the distance L4($i$+1) to determine the range R4($i$+2).

Specifically, the sensor controller 10 calculates the distance L4'($i$+1) by the following Equation (1).

$$L4'(i+1)=L3(i+1)+(L4(i)-L3(i)) \quad (1)$$

In this way, the sensor controller 10 calculates the distance L4'($i$+1) using a relative positional relationship between the two measurement values in the previous measurement. The sensor controller 10 sets the range R4($i$+2) so that the distance L4'($i$+1) becomes a middle value of the next range R4($i$+2).

As described above, when the previous measurement values L1($i$+1), L2($i$+1), L3($i$+1), L4($i$+1) are not included in the range R4($i$+1), the sensor controller 10 changes the setting range for the fourth surface 814 from the range R4($i$+1) to the range R4($i$+2) on the basis of the distance L4($i$), the distance L3($i$), and the distance L3($i$+1) included in the range R3($i$+1).

According to such a configuration, the range R4($i$+2) can be set accurately compared to the case that the range R4($i$+2) is set using the distance L4($i$+1) illustrated in FIG. 11.

Further, in the above description, L3($i$+1) and L3($i$) are used to set the range R4($i$+2). However, L2($i$+1) and L2($i$) may be used instead. Alternatively, the sensor controller 10 may use L1($i$+1) and L1($i$).

(c3. Functional Configuration)

Figure 13:
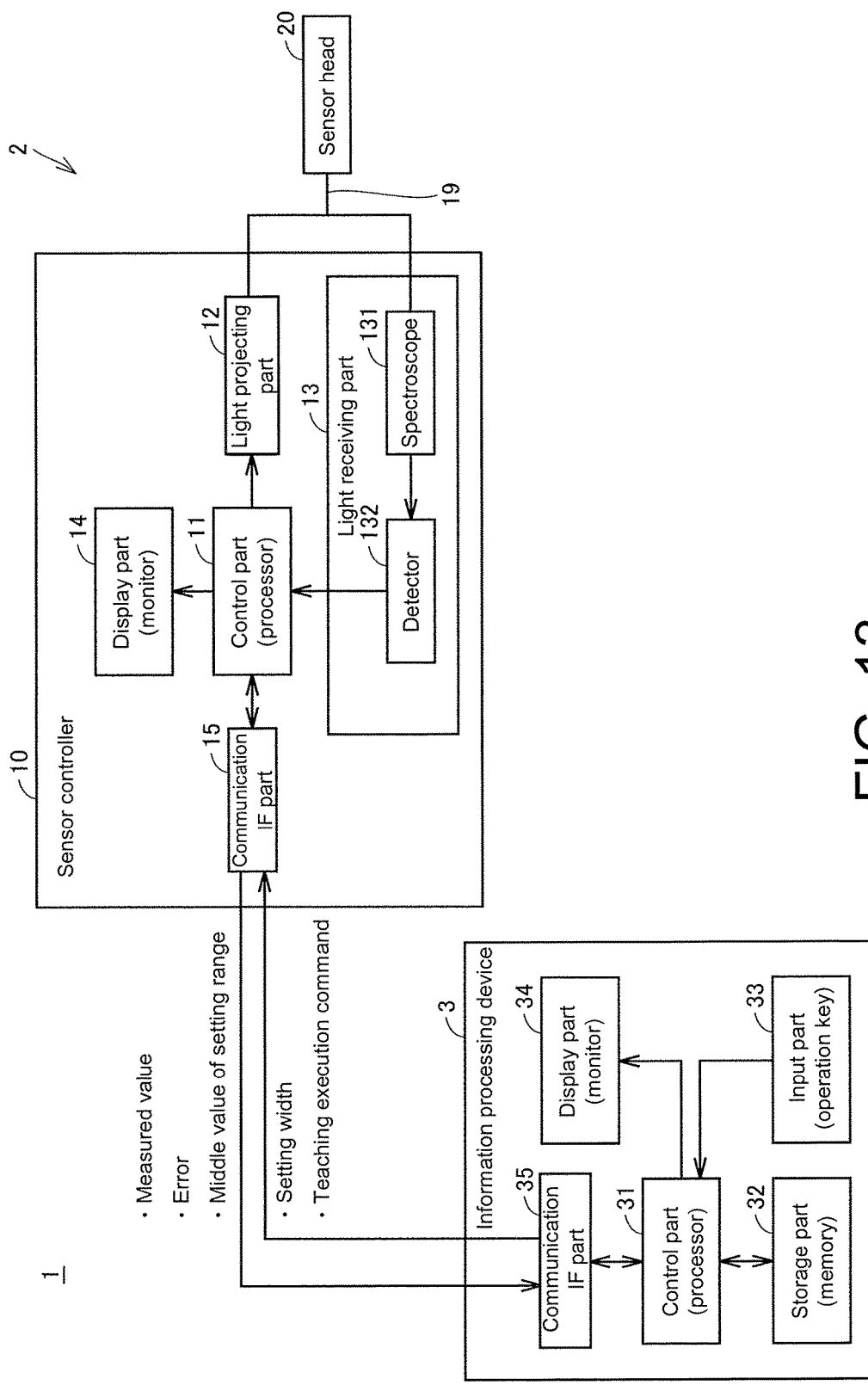
FIG. 13 is a diagram illustrating a functional configuration of the measuring system.

FIG. 13 is a diagram illustrating a functional configuration of the measuring system 1.

Referring to FIG. 13, as described above, the measuring system 1 includes the displacement sensor 2 and the information processing device 3. The displacement sensor 2 includes the sensor controller 10, the light guiding part 19 and the sensor head 20.

The sensor controller 10 includes a control part 11, a light projecting part 12, a light receiving part 13, a display part 14 and a communication interface (IF) part 15. The light receiving part 13 includes a spectroscope 131 and a detector 132.

The irradiation light having a preset wavelength spread generated in the light projecting part 12 propagates through the light guiding part 19 and reaches the sensor head 20. The reflected light which is incident again on the sensor head 20 propagates through the light guiding part 19 and is incident toward the light receiving part 13. In the light receiving part 13, the reflected light incident on the spectroscope 131 is separated into each wavelength component, and the intensity of each wavelength component is detected by the detector 132.

The control part 11 calculates a distance (displacement) from the sensor head 20 to each of the surfaces 811 to 814 of the measurement target 800 on the basis of detection results of the detector 132. Further, the control part 11 changes (resets) the setting range for each of the surfaces 811 to 814.

The display part 14 displays the distance calculated by the control part 11 as a numerical value.

Among a plurality of light receiving elements of the light receiving part 13 that forms the detector 132, a light receiving element which receives the reflected light changes in accordance with a shape of the surface of the measurement target 800 with respect to the sensor head 20. Therefore, it is possible to measure a change in distance (displacement) with respect to each of the surfaces 811 to 814 of the measurement target 800 based on the detection result (pixel information) of the plurality of light receiving elements of the detector 132. Accordingly, the shape of each measurement target surface of the measurement target 800 can be measured by the displacement sensor 2.

The communication IF part 15 is used for communication with the information processing device 3.

The information processing device 3 includes a control part 31, a storage part 32, an input part 33, a display part 34, and a communication IF part 35.

The control part 31 controls an operation of the information processing device 3. The control part 31 executes a preset application program based on an operating system stored in the storage part 32. An example of a screen (user interface) displayed on the display part 34 by executing the application program will be described later.

The control part 31 receives a user input (input operation) via the input part 33. Further, the control part 31 outputs a screen to the display part 34. The control part 31 communicates with the sensor controller 10 via the communication IF part 35.

The information processing device 3 transmits information on a setting width of the setting ranges and a teaching execution command used for the initial setting to the sensor controller 10. The setting width is a value input using the input part 33. Further, for example, the setting width is a value obtained by subtracting L11($i$) from L12($i$) in the case of the range R1($i$) in FIG. 2.

Further, the teaching execution command is transmitted from the information processing device 3 to the sensor controller 10 by the user selecting a preset object (hereinafter, referred to as a "teaching button") displayed on the display part 34.

The sensor controller 10 transmits a measurement value to the information processing device 3, for example, whenever measurement is performed with respect to the information processing device 3. Further, a measurement value processed as an error is not transmitted to the information processing device 3. Also, in the case of an error, the sensor controller 10 notifies the information processing device 3 of that fact. In addition, the sensor controller 10 notifies the information processing device 3 of a value (distance) in the middle of the setting range whenever the setting range (ranges R1($i$) to R4($i$)) for each of the surfaces 811 to 814 is changed (reset).

The information processing device 3 updates and displays the measurement value (waveform) and the like on the display part 34 based on a variety of received data. The user can see the screen of the display part 34 and thus can check temporal change of the waveform and so on.

(c4. Control Structure)

Figure 14:
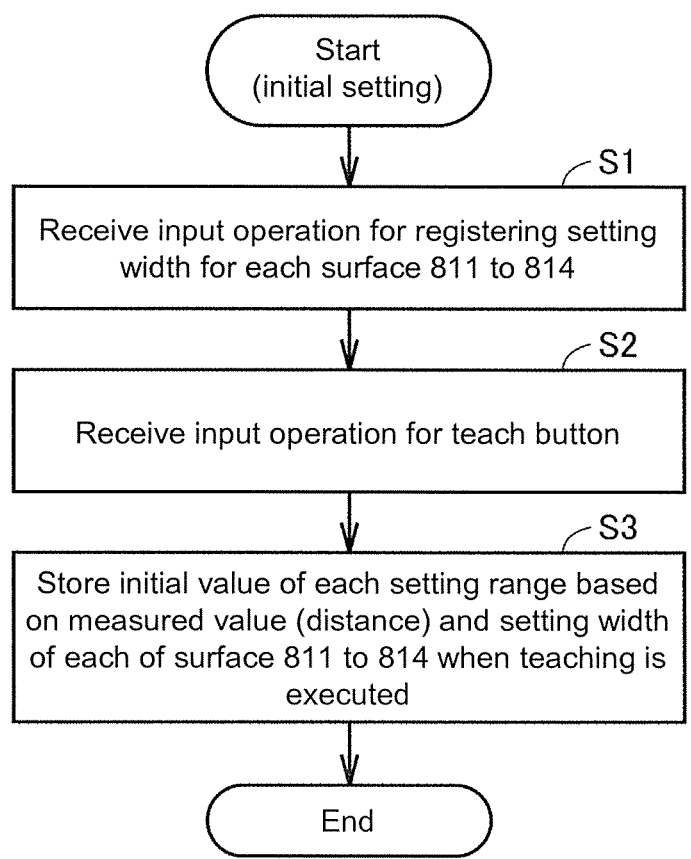
FIG. 14 is a flowchart illustrating a flow of processing at initial setting.

FIG. 14 is a flowchart illustrating a flow of processing at the initial setting.

Referring to FIG. 14, in Step S1, the information processing device 3 receives an input operation (user input) for registering the setting width of each of the surfaces 811 to 814. When a setting width is input, in Step S2, the information processing device 3 receives an input operation for the teaching button. Therefore, the information on the setting width is transmitted from the information processing device 3 to the sensor controller 10.

In Step S3, the sensor controller 10 stores initial values R1(1), R2(1), R3(1) and R4(1) of the respective setting ranges on the basis of the measurement values (distances) for the surfaces 811 to 814 when teaching is performed and the information of the setting widths of the surfaces 811 to 814 received from the information processing device 3.

Figure 15:
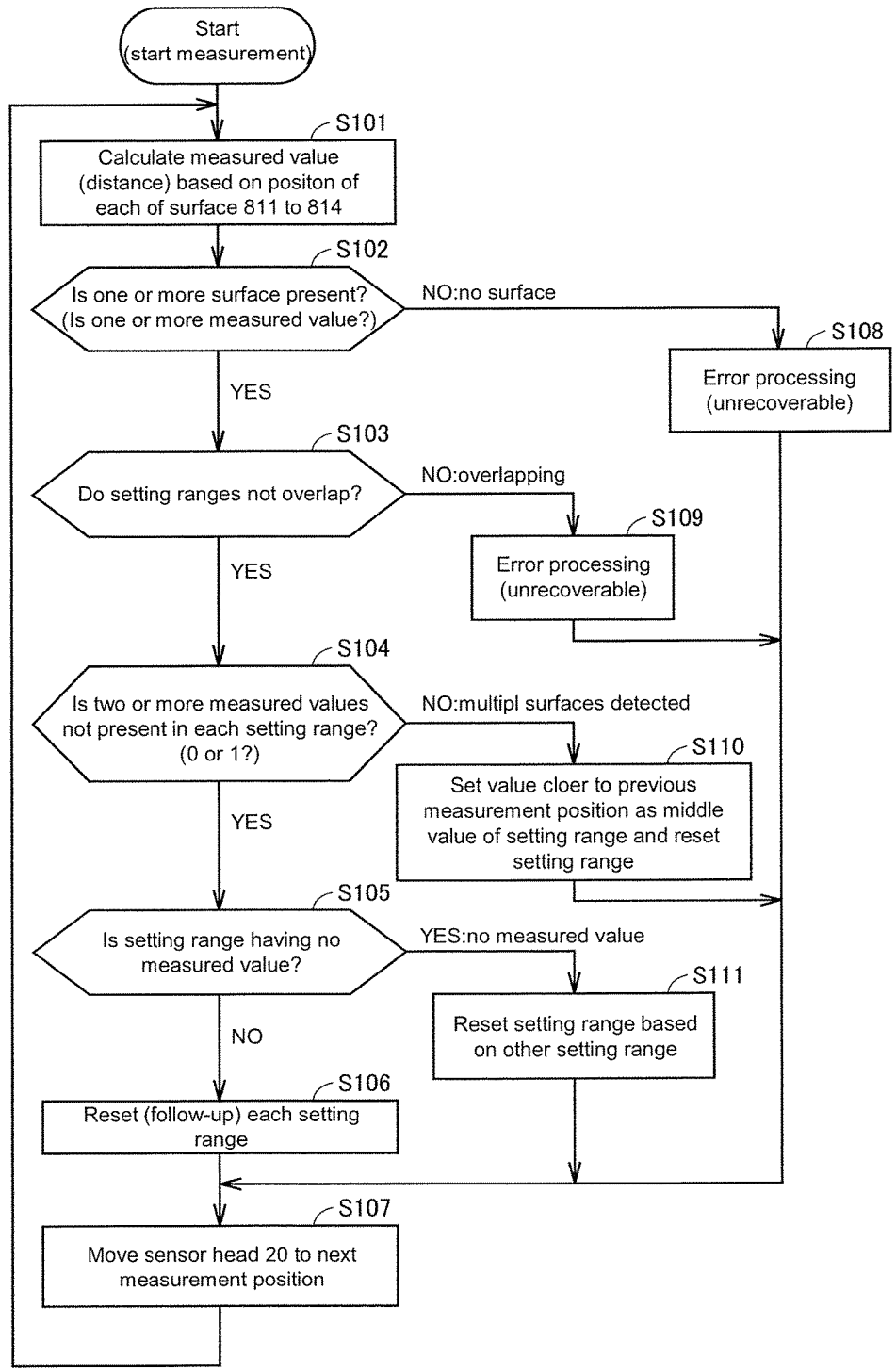
FIG. 15 is a flowchart illustrating a flow of measurement processing performed after the initial setting is completed.

FIG. 15 is a flowchart illustrating a flow of measurement processing performed after the initial setting is completed.

Referring to FIG. 15, in Step S101, the sensor controller 10 calculates the measurement values (distances) on the basis of the positions of each of the surfaces 811 to 814. In Step S102, the sensor controller 10 determines whether or not there are one or more measurement target surfaces on the basis of calculation results. That is, the sensor controller 10 determines whether or not there are one or more measurement values.

When it is determined that there are one or more surfaces (YES in Step S102), in Step S103, the sensor controller 10 determines whether or not the setting ranges overlap.

When it is determined that there are no surfaces (No in Step S102), in Step S108, the sensor controller 10 performs the error processing for no surface. Specifically, as described with reference to FIG. 7, the sensor controller 10 determines that no measurement target surfaces are present and processes this as an error of deviating from all the setting ranges. Specifically, for this measurement instance, the sensor controller 10 assumes that there is no data indicating a distance to any of the surfaces 811 to 814.

When it is determined that the setting ranges do not overlap (YES in Step S103), in Step S104, the sensor controller 10 determines whether or not two or more measurement values are present in each of the setting ranges. That is, the sensor controller 10 determines whether there are zero or only one measurement value included in one setting range.

When it is determined that the setting ranges overlap (NO in Step S103), in Step S109, the sensor controller 10 performs the error processing as overlapping of the setting ranges. Specifically, as described with reference to FIG. 8, for this measurement instance, the sensor controller 10 determines that there is no measurement value (in the case of FIG. 3, the distance L3($i$) and the distance L4($i$)) for each surface included in the overlapping setting ranges.

When it is determined that two or more measurement values are not present within each of the setting ranges (YES in Step S104), in Step S105, the sensor controller 10 determines whether or not there is a setting range in which a measurement value is not present.

When it is determined that two or more measurement values are not present within each of the setting ranges (NO in Step S104), in Step S110, the sensor controller 10 sets the value closer to the previous measurement position as a middle value of the setting range and sets the setting range for the next measurement instance, as described with reference to FIGS. 9 and 10.

When it is determined that a measurement value is present in each of the setting ranges (NO in Step S105), in Step S106, the sensor controller 10 resets each of the setting ranges, for example, as described with reference to FIG. 6.

When it is determined that there is a setting range in which a measurement value is not present (YES in Step S105), in Step S111, for the setting range in which a measurement value is not present, the sensor controller 10 changes the setting range using a measurement value in a setting range in which a measurement value is present within a setting range, as described with reference to FIGS. 11 and 12. Further, for the setting range in which a measurement value is present within the setting range, the setting range is also changed by using the measurement value.

In Step S107, the sensor controller 10 moves the sensor head 20 to a next measurement position, as indicated by an arrow 600 in FIG. 1.

D. User Interface

Next, an example of the screen displayed on the display part 34 (refer to FIG. 13) of the information processing device 3 will be described. Further, display of the screen is performed by the control part 31.

(d1. Setting Screen)

Figure 16:
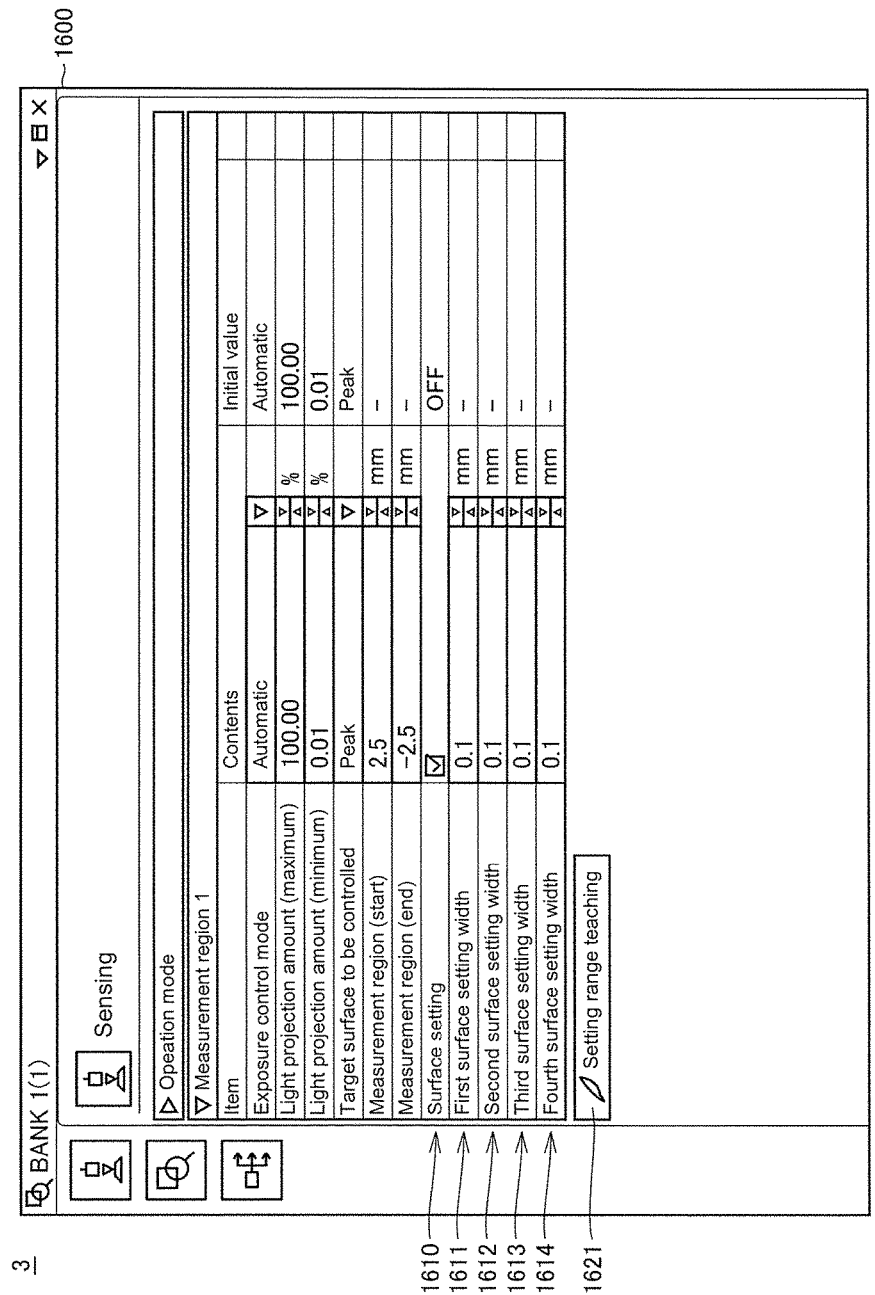
FIG. 16 is a diagram illustrating a screen displayed at the time of initial setting.

FIG. 16 is a diagram illustrating a screen displayed at the time of initial setting.

Referring to FIG. 16, at least a check box 1610, setting items 1611, 1612, 1613 and 1614, and an object 1621 are displayed on a screen 1600.

The check box 1610 is used for determining whether or not to set the measurement target surface. The setting item 1611 is used for inputting the setting width of the first surface 811. The setting item 1612 is used for inputting the setting width of the second surface 812. The setting item 1613 is used for inputting the setting width of the third surface 813. The setting item 1614 is used for inputting the setting width of the fourth surface 814.

The object 1621 is an object for the user to instruct execution of teaching.

(d2. During Normal Processing)

Figure 17:
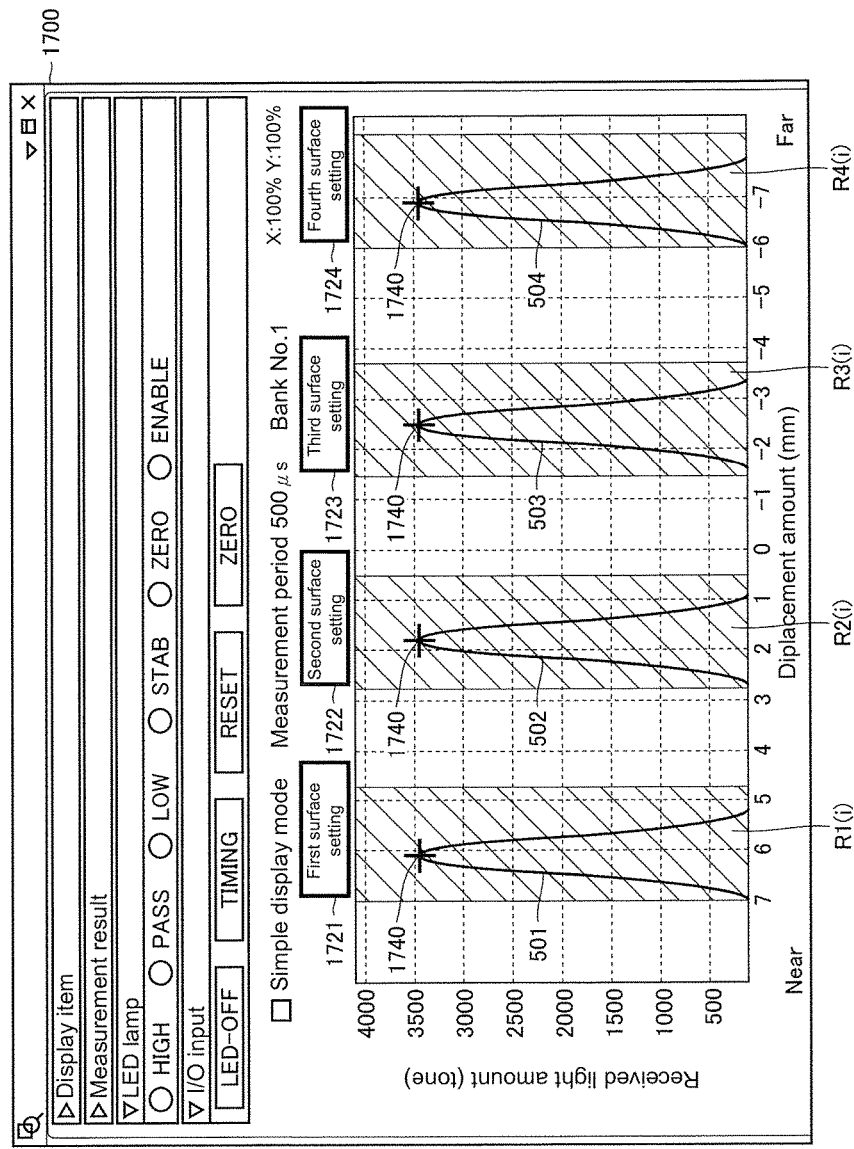
FIG. 17 is a diagram illustrating a screen of a measurement instance at which measurement is performed normally.

FIG. 17 is a diagram illustrating a screen of a measurement instance at which the measurement is performed normally. Further, FIG. 17 is also a diagram corresponding to the state of FIG. 3.

Referring to FIG. 17, the control part 31 displays a screen 1700 at least including marks 1721, 1722, 1723 and 1724, waveforms 501 to 504, and four cross marks 1740.

The control part 31 displays an inside of the setting range in a manner different from other ranges. For example, the control part 31 sets a background color within the setting range to a color different from the background color of the other range. Specifically, the control part 31 sets the setting range (ranges R1($i$), R2($i$), R3($i$) and R4($i$)) to have a green color and thus makes it different from a white color as the color of the other range.

The marks 1721, 1722, 1723 and 1724 serve to visually identify each of four setting regions. The control part 31 moves positions of the marks 1721, 1722, 1723 and 1724 left and right according to a change of the corresponding setting range. Typically, the control part 31 causes the positions of the marks 1721, 1722, 1723 and 1724 to be in the middle of the corresponding setting range.

The cross mark 1740 is displayed at peak positions of the waveforms 501 to 504.

(d3. When Setting Ranges Overlap: NO in Step S103)

Figure 18:
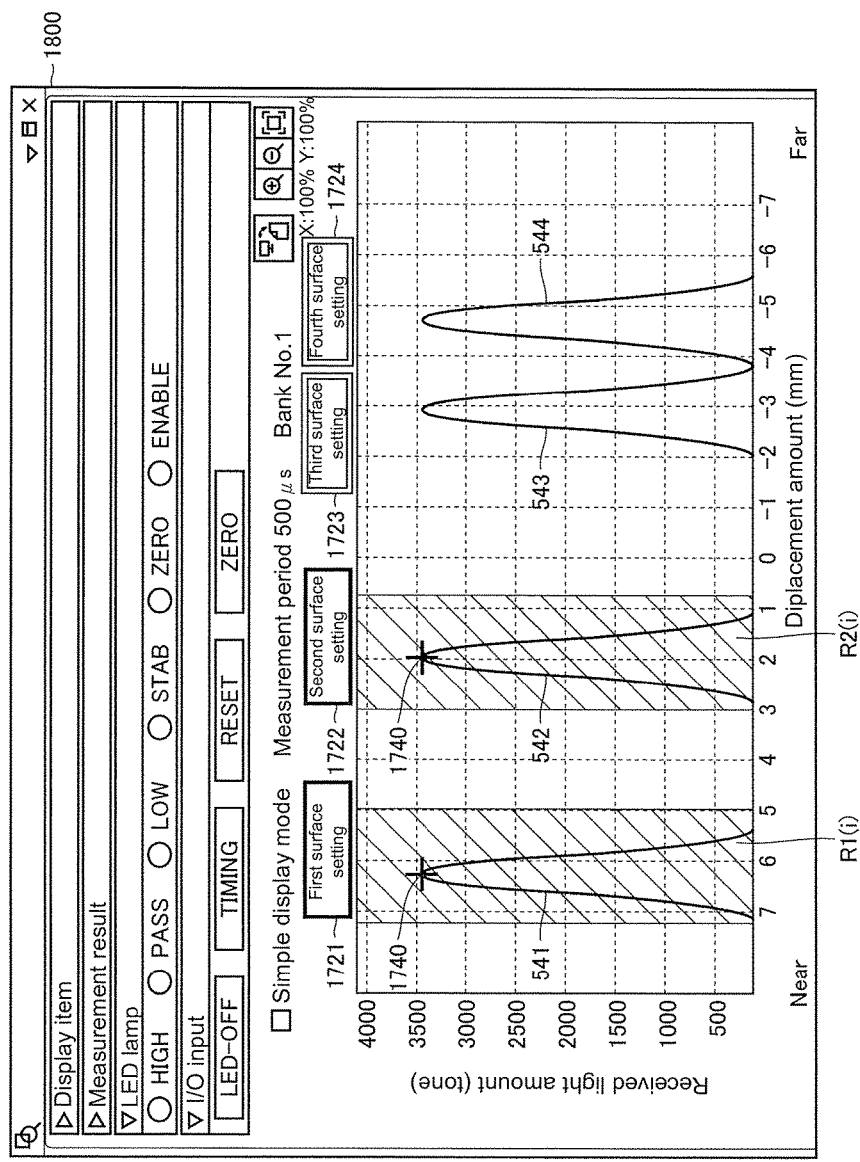
FIG. 18 is a diagram illustrating a screen of a measurement instance when setting ranges overlap.

FIG. 18 is a diagram illustrating a screen of a measurement instance when the setting ranges overlap. Further, FIG. 18 is a diagram corresponding to a state of FIG. 8.

Referring to FIG. 18, control part 31 displays a screen 1800 including at least the marks 1721 to 1724, the waveforms 541 to 544, and two cross marks 1740.

Regarding a difference from the screen 1700 illustrated in FIG. 17, in the screen 1800, for the setting range R3($i$) of the third surface 813 and the setting range R4($i$) of the fourth surface 814, no coloration such as green coloring is performed to visually notify the user of the occurrence of overlapping.

Further, the control part 31 displays the marks 1723 and 1724 for measurement target surface with overlapping setting ranges in a manner different from the marks 1721 and 1722 for measurement target surface without overlapping. For example, the control part 31 sets the color of the whole of the marks 1723 and 1724 or the color of a part (for example, a frame) of the mark to a color (hereinafter also referred to as a "default color") different from the color of the marks 1721 and 1722.

Further, since the measurement value (distance) based on the waveforms 543 and 544 is processed as the error (the measurement value is not determined), the control part 31 does not display the cross mark 1740 on the peaks of the waveforms 543 and 544 to visually notify the user.

(d3. Measurement Target Surface is not Present: NO in Step S102)

Figure 19:
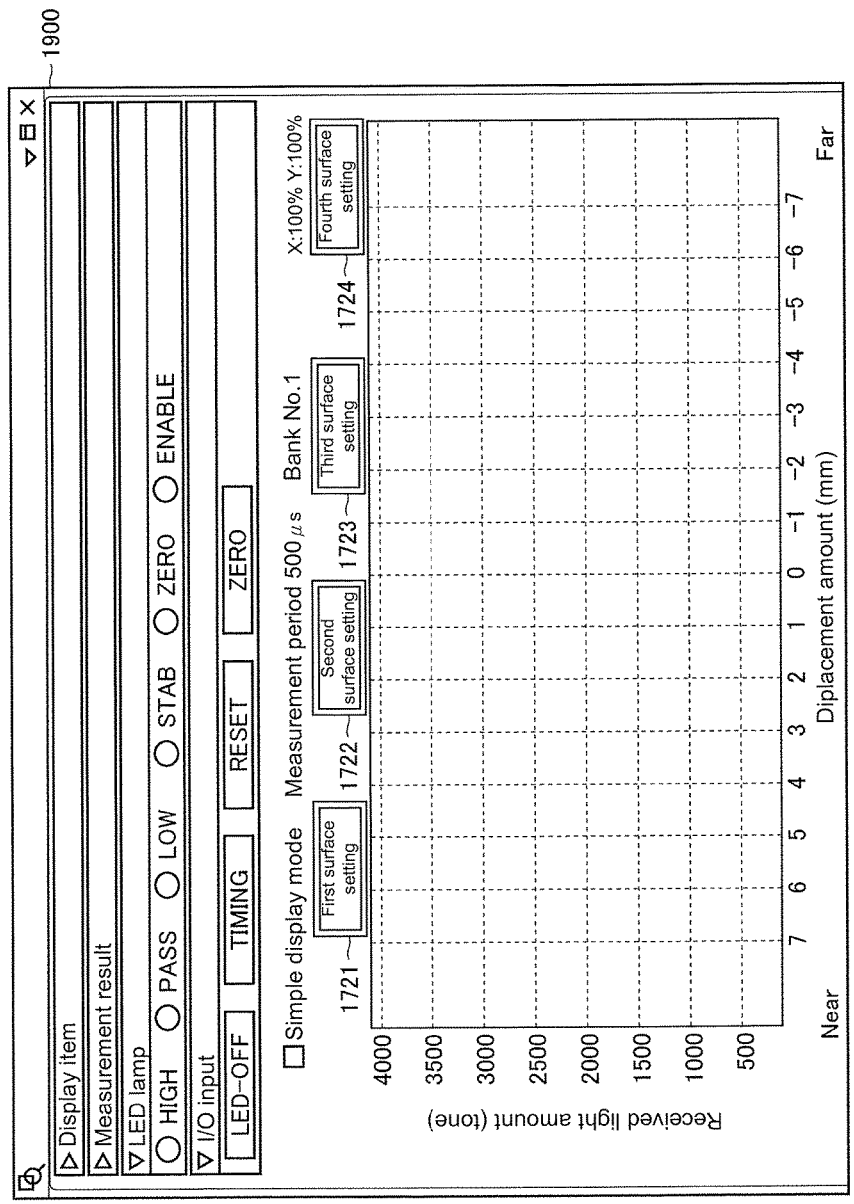
FIG. 19 is a diagram illustrating a screen of a measurement instance when it is determined by a sensor controller that a measurement target surface is not present.

FIG. 19 is a diagram illustrating a screen of a measurement instance when it is determined by the sensor controller 10 that the measurement target surface is not present. Further, FIG. 19 is a diagram corresponding to a state of FIG. 7.

Referring to FIG. 19, the control part 31 displays a screen 1900 including at least the marks 1721 to 1724. However, the control part 31 display all the setting ranges not in green or the like to notify the user that the peak of each of the waveforms in all the setting ranges is not included.

Further, the control part 31 sets each of the marks 1721 to 1724 to have a color different from the default color as described in FIG. 18. Furthermore, as an example, a position of each of the marks 1721 to 1724 is set as a default position.

(d4. When There is Setting Range in which Measurement Value is not Present: YES in Step S105)

Figure 20:
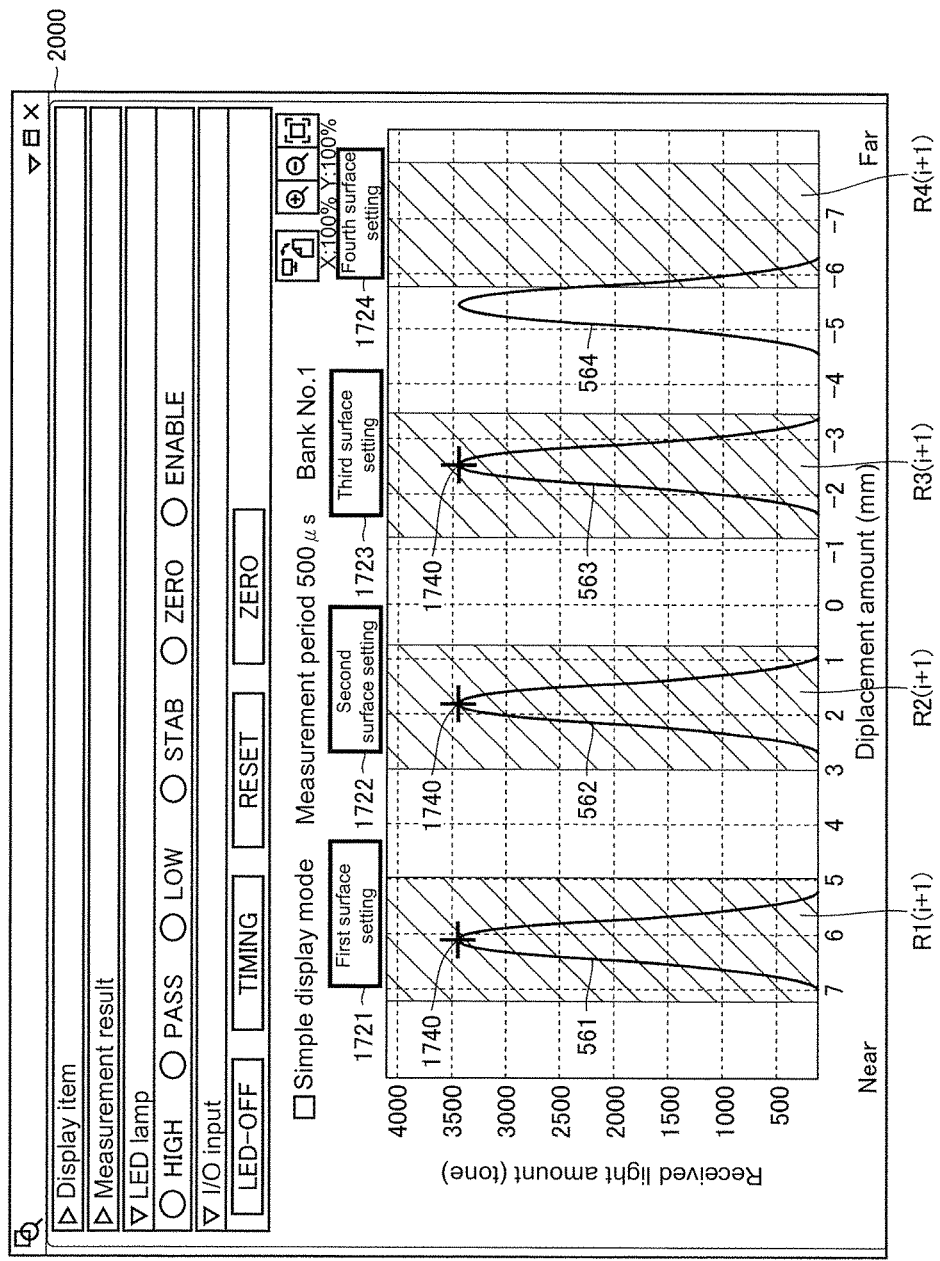
FIG. 20 is a diagram illustrating a screen of a measurement instance when it is determined by a sensor controller that there is a setting range in which a measurement value is not present.

FIG. 20 is a diagram illustrating a screen of a measurement instance when it is determined by a sensor controller 10 that there is a setting range in which a measurement value is not present. Further, FIG. 20 is a diagram corresponding to the stage of FIG. 11.

Referring to FIG. 20, the control part 31 displays a screen 2000 including at least the marks 1721 to 1724, the waveforms 561 to 564, and four cross marks 1740.

Since it is determined that the setting ranges do not overlap and the measurement target surface is present, the control part 31 displays all the setting ranges in a manner different from the other ranges, as in FIG. 17. However, since the peak of the waveform 564 is out of the range R4($i$+1), the control part 31 does not display the cross mark 1740 on the peak of the waveform 564 in the viewpoint of notifying the user that it is out of the range.

(d5. Summary of Errors)

Table 1 is a table summarizing the above-described errors.

TABLE 1

| Error category | Error occurrence condition | State after error |
|---|---|---|
| Error out of setting range (* uncoverable error) | No surface to be measured is detected | Switch all setting range into error state |
| | Setting rages overlap | Switch overlapping setting ranges into error state |
| Received light waveform error (* coverable error) | Two or more peaks are detected within one setting range | Delete cross mark of peak Display cross mark at peak position again when surface is detected again within setting range |
| | There is setting range that no measured value is present | Delete cross mark of peak Display cross mark at peak position again when surface is detected again within setting range |

Referring to table 1, error categories include an error out of the setting range and a received light waveform error.

A first occurrence condition of the error out of the setting range is that no measurement target surface is detected as illustrated in FIG. 7 (NO in Step S102 in FIG. 15). Further, a second occurrence condition of the error out of the setting range is that the setting ranges overlap as illustrated in FIG. 8 (NO in Step S103 of FIG. 15).

A first occurrence condition of the received light waveform error is that two or more peaks are detected within one setting range as illustrated in FIG. 9 (NO in Step S104 of FIG. 15). Further, a second occurrence condition of the received light waveform error is that there is a setting range in which the measurement value is not present (NO in Step S105 in FIG. 15).

Display contents of the screen in the information processing device 3 corresponding to each of the error occurrence conditions are described in a column of a state after error. These descriptions correspond to FIG. 17, FIG. 18, FIG. 19 and FIG. 20 in order from the top to the bottom.

The sensor controller 10 processes the error out of the setting as an unrecoverable error. On the other hand, the sensor controller 10 processes the received light waveform error as a recoverable error.

In the received light waveform error, when the measurement is performed again at the same position and the measurement value (the distance of the peak of the waveform) is included in the setting range, there is no problem even if the measurement value is processed as the distance to the measurement target surface, and thus the received light waveform error is classified as the recoverable error.

In the error out of the setting range, even if the measurement value is included in the setting range, it is not appropriate to process the measurement value as the distance to the measurement target surface, and thus the error out of the setting range is classified as the unrecoverable error. In the case of the error out of the setting range, the sensor controller 10 moves a position of the sensor head 20 to a next measurement position without performing another measurement.

E. Modified Example (1) Displacement Measuring Device

In the above description, a displacement measuring device using the white confocal method has been described as the displacement sensor 2. That is, in the above description, an example of a configuration of the displacement measuring device including (i) a light projecting part (light source) which generates light having a preset wavelength spread, (ii) an irradiation part (a part of the sensor head) which irradiates light to a measurement target having a plurality of layers which can allow light to pass through so that the light is focused at different positions on an optical axis for each wavelength, (iii) a light receiving part which receives light of each wavelength focused on and reflected by a measurement target surface of each of the plurality of layers and also detects each wavelength from the received light, and (iv) a control part which calculates a distance to the measurement target (each measurement target surface) for each wavelength on the basis of each detected wavelength has been described as the displacement sensor 2.

However, the displacement measuring device is not limited to such a configuration. For example, the above-described processing in the control part 11 may also be applied to a displacement sensor (displacement measuring device) using a triangulation method.

In such a displacement sensor using the triangulation method, a part of the light which is diffusely reflected from the measurement target is focused on a lens in the displacement sensor. As a result, an image is formed on a position sensor (imaging element) such as a complementary metal oxide semiconductor (CMOS) in the displacement sensor. When the distance to the measurement target changes, a light receiving position on the position sensor also changes. Therefore, the control part 11 can obtain the distance to the measurement target by specifying the light receiving position on the position sensor.

As described above, the displacement measuring device may include (a) a light projecting part which generates light, (b) a head sensor which irradiates light to a measurement target having a plurality of layers allowing light to pass through and also receives light of the irradiated light reflected by a measurement target surface of each of the plurality of layers, and (c) a control part which calculates a distance to each measurement target surface on the basis of the light received by the sensor head, wherein (d) the control part processes a first distance of a plurality of calculated distances which is included in a preset numerical range (for example, a first setting range) as a distance to the measurement target surface of a preset layer (for example, a first layer) of the plurality of layers.

Further, in such configurations (c) and (d), in the case of the triangulation method, the control part may be configured to calculate the light receiving position (specifically, a pixel value indicating a pixel position of the position sensor) on the position sensor instead of the distance and also to process a first pixel value of a plurality of calculated pixel values included in the preset numerical range as a pixel value to the measurement target surface of the preset layer of the plurality of layers.

Further, in such configurations (c) and (d), in the case of the white confocal method, the control part may be configured to calculate the wavelength of the light instead of the distance and also to process a first wavelength of a plurality of calculated wavelengths included in the preset numerical range as a wavelength to the measurement target surface of the preset layer of the plurality of layers.

As described above, the control part may be configured to calculate a value (distance, pixel value, wavelength) indicating the distance. That is, the control part may be configured to process a first value of a plurality of calculated values indicating the distance included in the preset numerical range as a value indicating the distance to the measurement target surface of the preset layer of the plurality of layers.

(2) Measurement Target

In the above description, although the measurement target 800 having the plurality of layers 810, 820 and 830 each of which can allow light (typically, white light) to pass through is taken as an example of the measurement target, the measurement target is not limited to such a configuration.

For example, the measurement object may have a configuration having only one layer (for example, layer 830). That is, the layer which allows light to pass through may be a single layer.

In addition, the measurement target may not have such a layer (a layer which allows light to pass through). A configuration in which only one measurement target surface is measured may be adapted.

(3) Setting Range

In the above description, an example of the configuration in which, in the teaching mode, the information processing device 3 or the sensor controller 10 automatically determines the initial values R1(1), R2(1), R3(1) and R4(1) in the ranges R1(i) to R4(i) has been described, but the disclosure is not limited thereto. The user may determine (set) the initial values R1(1), R2(1), R3(1) and R4(1).

Further, in the above description, determination processing using the ranges R1(i) to R4(i) with respect to the four measurement target surfaces (the first surface 811, the second surface 812, the third surface 813 and the fourth surface 814) is performed, but the disclosure is not limited thereto. The determination processing using the ranges may be performed with respect to three or less measurement target surfaces on the basis of the user operation. That is, the information processing device 3 or the sensor controller 10 may be configured so that the user can set the setting range of at least one of the surfaces 811 to 814.

As described above, the information processing device 3 or the sensor controller 10 may be configured to receive a user input for setting the numerical range corresponding to one or more measurement target surfaces among the plurality of measurement target surfaces in association with the measurement target surface and also to process a value included in the numerical range as a value indicating a distance to the measurement target surface corresponding to the numerical range.

For example, the information processing device 3 or the sensor controller 10 may be configured to receive the user input for setting the numerical ranges R1(1) and R2(1) among four initial values R1(1), R2(1), R3(1) and R4(1), to process a value included in R1(1) as a value indicating a distance to the first surface 811 corresponding to the numerical range and also to process a value included in R2(1) as a value indicating a distance to the second surface 812 corresponding to the numerical range. Further, in this case, the distances to the third surface 813 and the fourth surface 814 are set to the values calculated by the information processing device 3 or the sensor controller 10, because there is no range designation.

(Automatic Setting of Setting Width)

In the above description, an example of the configuration in which the user input of the width (setting width) of the setting range is received has been described. However, the sensor controller 10 or the information processing device 3 may automatically calculate an optimum setting width. Hereinafter, such a configuration will be described with reference to FIG. 21. Further, the setting width does not change dynamically, and the same value is used during the measurement.

Figure 21:
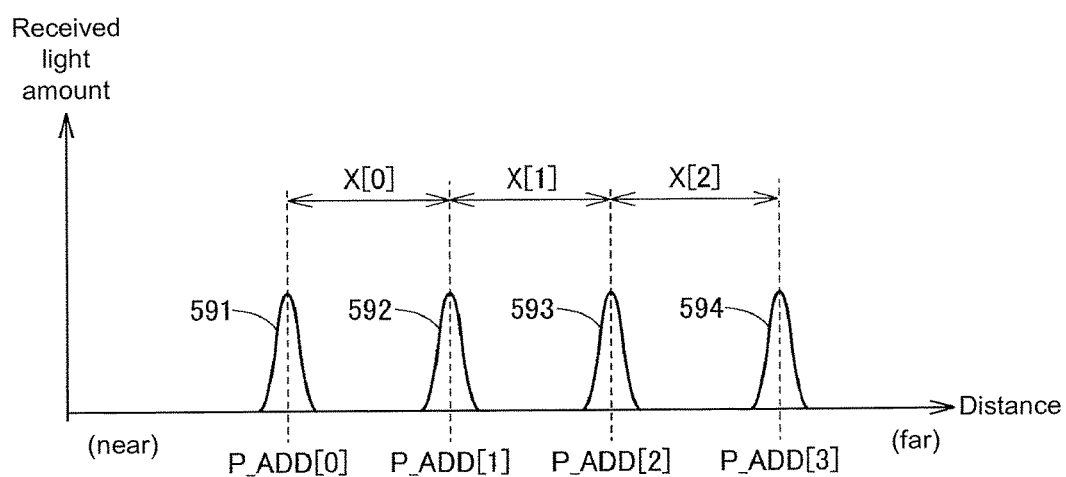
FIG. 21 is a diagram illustrating automatic setting of a setting width.
Figure 22:
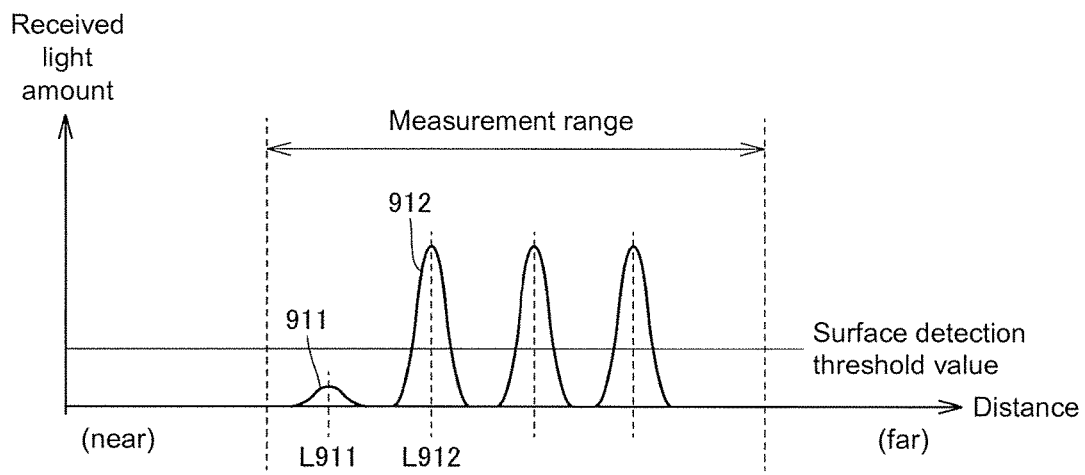
FIG. 22 is a diagram illustrating a waveform detected by a displacement sensor.
Figure 23:
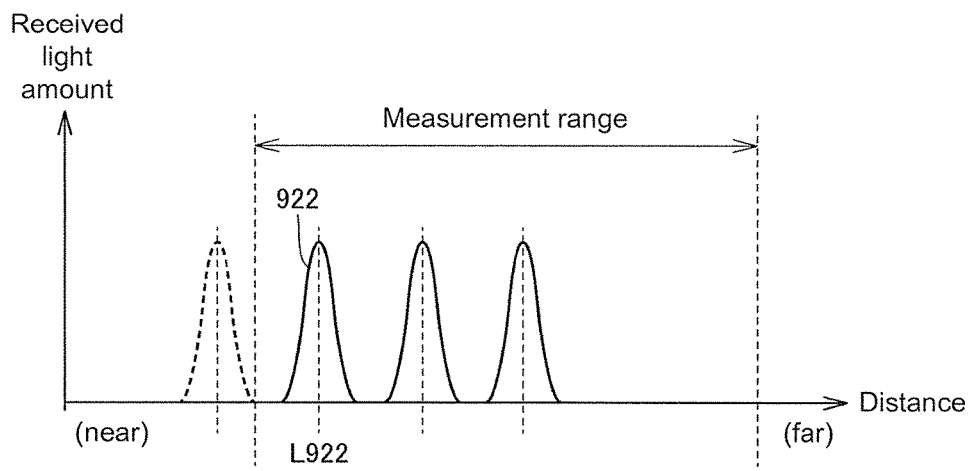
FIG. 23 is a diagram illustrating another waveform detected by the displacement sensor.

FIG. 21 is a diagram illustrating automatic setting of the setting width. Referring to FIG. 21, the sensor controller 10 detects waveforms 591, 592, 593 and 594 of four wavelengths.

In the following, a variable N is the number of surfaces. When N is 0, there is no surface detection. Further, in this example, a maximum value of N is 4. A variable X[n] is a relative distance of each surface (the unit is pixel). Further, the unit may be mm. When calculation is performed with the pixel value, it is necessary to convert it to a mm value eventually. A variable TW[n] is the setting width (edge track width). n is a natural number greater than or equal to 2 and less than or equal to N−1.

Here, it is assumed that the peaks of the waveforms 591, 592, 593 and 594 of the four wavelengths are respectively P_ADD[0], P_ADD[1], P_ADD[2] and P_ADD[3]. Further, the unit is a pixel.

In this case, the sensor controller 10 sets the setting width of the first surface 811, the setting width of the second surface 812, the setting width of the third surface 813, and the setting width of the fourth surface 814 as follows.

(a) Setting width of first surface 811=X[0]/4
(b) Setting width of second surface 812=X[1]/4 (when X[0]/4>X[1]/4)
X[0]/4 (other than the above)
(c) Setting width of third surface 813=X[2]/4 (when X[1]/4>X[2]/4)
X[1]/4 (other than the above)
(d) Setting width of fourth surface 814=X[2]/4

In this way, the sensor controller 10 sets the optimum width based on the relative position of each surface.

Actually, it is necessary to change Equation for calculating the setting width according to the number of detected surfaces. A flow of the actual processing is as shown in the following procedures (i) to (iii).

(i) Confirmation of the Number N of Detected Surfaces

The sensor controller 10 confirms the number N of detected surfaces. When N=0, the sensor controller 10 processes it as an error. Further, When N=1, the sensor controller 10 sets the setting width of the first surface 811 to the default value.

(ii) Calculation of Relative Distance of Each Surface (When Two or More Surfaces are Detected)

The sensor controller 10 performs a calculation indicated by the following Equation (2).

$$X[n]=\text{abs}(P\_ADD[n+1]-P\_ADD[n]) \quad (2)$$

Further, n is a value from 0 to N−2. Equation (1) is an expression for calculating an absolute value of a difference between adjacent values.

(iii) Automatic Calculation of Setting Width (When Two or More Surfaces are Detected)

Regarding the setting width of an end surface, the sensor controller 10 calculates it on the basis of the following Equations (3) and (4).

$$TW[0]=X[0]/4 \quad (3)$$

$$TW[N-1]=X[N-2]/4 \quad (4)$$

Regarding the setting width of an intermediate surface, the sensor controller 10 calculates it on the basis of the following Equations (5) and (6). Further, the intermediate surface is present when three or more surfaces are detected. For example, when four surfaces are detected, a second surface and a third surface correspond to the intermediate surfaces. When N=2, processing according to the following Equations (5) and (6) is unnecessary.

$$TW[n-1]=X[n-2]/4 \text{ (when } X[n-1]>X[n-2]/4) \quad (5)$$

$$TW[n-1]=X[n-1]/4 \text{ (other than the above)} \quad (6)$$

According to the above-described configuration, it is possible to accurately measuring a distance to each measurement target surface according to one or more embodiments.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A displacement measuring device, comprising:
a light projecting part configured to generate light;
a sensor head configured to irradiate a measurement target with the light and to receive light reflected by a measurement target surface of the measurement target from the irradiated light; and
a processor configured to:
calculate a value indicating a distance to the measurement target surface on the basis of the light received by the sensor head,
process the calculated value as the value indicating the distance to the measurement target surface with the calculated value being included in a preset numerical range, and
reset the preset numerical range to a new numerical range which has the same width as the preset numerical range by having the calculated value as a middle value of the new numerical range.

2. The displacement measuring device according to claim 1, wherein the measurement target includes a first layer on a base material, and the first layer is capable of allowing the light to pass through,
the sensor head is configured to receive light reflected by each of a measurement target surface of the base material and a measurement target surface of the first layer from the irradiated light, and the processor is configured to calculate a value indicating a distance to each of the measurement target surfaces on the basis of the light received by the sensor head and processes a first value of the calculated values, which is included in a first numerical range as the preset numerical range, as a value indicating a distance to the measurement target surface of the first layer.

3. The displacement measuring device according to claim 2, wherein the processor is configured to process a second value of the calculated values, which is included in a second numerical range as the preset numerical range not overlapping the first numerical range, as a value indicating a distance to the measurement target surface of the base material.

4. The displacement measuring device according to claim 2, wherein the measurement target has a second layer stacked on the first layer,
the sensor head is further configured to receive light which is reflected by a measurement target surface of the second layer from the irradiated light, and
the processor is configured to process a second value of the calculated values, which is included in a second numerical range as the preset numerical range not overlapping the first range, as a value indicating a distance to the measurement target surface of the second layer.

5. The displacement measuring device according to claim 1, wherein, when a relative position between the sensor head and the measurement target changes due to movement of the sensor head or the measurement target,
the processor is configured to recalculate the value indicating the distance to the measurement target surface on the basis of the light received by the sensor head after the relative position is changed and processes a value of the recalculated values, which is included in the numerical range after resetting, as a distance to the measurement target surface at a position after the relative position is changed.

6. The displacement measuring device according to claim 3, wherein, when a relative position between the sensor head and the measurement target changes due to movement of the sensor head or the measurement target,
the processor is configured to recalculate the value indicating the distance to each of the measurement target surfaces on the basis of the light received by the sensor head after the relative position is changed and processes a third value of the recalculated values, which is included in the first numerical range after resetting, as a distance to the measurement target surface of the first layer at a position after the relative position is changed.

7. The displacement measuring device according to claim 4, wherein, when a relative position between the sensor head and the measurement target changes due to movement of the sensor head or the measurement target,
the processor is configured to recalculate the value indicating the distance to each of the measurement target surfaces on the basis of the light received by the sensor head after the relative position is changed and processes a third value of the recalculated values, which is included in the first numerical range after resetting, as a distance to the measurement target surface of the first layer at a position after the relative position is changed.

8. The displacement measuring device according to claim 5, wherein the displacement measuring device is configured to change the relative position by moving the sensor head in a direction perpendicular to an optical axis.

9. The displacement measuring device according to claim 6, wherein, when the third value and a fourth value are included in the first numerical range after the resetting, the control processor is further configured to change the first numerical range after the resetting so that one of the third value and the fourth value closer to the first value becomes the middle value of the first numerical range after once more resetting.

10. The displacement measuring device according to claim 6, wherein the processor is configured to reset the second numerical range on the basis of the second value included in the second numerical range and then reset again the first numerical range on the basis of the first value, the second value and a fifth value included in the second numerical range after the resetting when the recalculated values are not included in the first numerical range after the resetting.

11. The displacement measuring device according to claim 1, wherein the sensor head is configured to receive light reflected by each of measurement target surfaces of the measurement target, and
the processor is configured to:
receive a user input configured to specify a numerical range corresponding to one or more of the measurement target surfaces in association with the measurement target surface,
calculate a value indicating a distance to each of the measurement target surfaces on the basis of the light received by the sensor head, and
process the value included in the numerical range as a value indicating a distance to the measurement target surface corresponding to the numerical range.

12. The displacement measuring device according to claim 1, wherein the processor is configured to store a default value of the preset numerical range, and to change the default value on the basis of a teaching process.

13. The displacement measuring device according to claim 1, wherein the processor is configured to reset the numerical range in a first operation mode and to not reset the numerical range in a second operation mode.

14. The displacement measuring device according to claim 3, wherein the processor is configured to determine a width of the first numerical range and a width of the second numerical range on the basis of the first value and the second value.

15. The displacement measuring device according to claim 4, wherein the processor is configured to determine a width of the first numerical range and a width of the second numerical range on the basis of the first value and the second value.

16. A measuring system which comprises the displacement measuring device according to claim 1 and an information processing device capable of communicating with the displacement measuring device,
wherein the information processing device is configured to display with a graph an amount of light received by a light receiving part of the displacement measuring device in association with a distance from the sensor head and to change a display mode of the preset numerical range in the displayed graph from a default mode to a preset mode.

17. The measuring system according to claim 16, wherein the information processing device is configured to make a graph display mode different between a case in which the value is not included in the preset numerical range and a case in which the value is included in the preset numerical range.

18. The measuring system according to claim 16, wherein the information processing device is configured to add a mark indicating that the preset numerical range in the displayed graph is the preset numerical range.

19. A displacement measuring method comprising steps as follow:
- generating light;
- irradiating a measurement target with the light;
- receiving light reflected by a measurement target surface of the measurement target from the irradiated light;
- calculating a value indicating a distance to the measurement target surface on the basis of the received light; and
- processing the calculated value as a value indicating the distance to the measurement target surface with the calculated value being included in a preset numerical range and resetting the preset numerical range to a new numerical range which has the same width as the preset numerical range by having the calculated value as a middle value of the new numerical range.

* * * * *